(12) United States Patent  
Cornell

(10) Patent No.: US 6,493,098 B1
(45) Date of Patent: Dec. 10, 2002

(54) DESK-TOP PRINTER AND RELATED METHOD FOR TWO-SIDED PRINTING

(76) Inventor: John S. Cornell, 100 Wolfpit Ave., Unit 26, Norwalk, CT (US) 06851

( * ) Notice: Subject to any disclaimer, the term of this patent is extended or adjusted under 35 U.S.C. 154(b) by 1000 days.

(21) Appl. No.: 08/831,910

(22) Filed: Apr. 2, 1997

Related U.S. Application Data

(63) Continuation-in-part of application No. 08/770,322, filed on Dec. 20, 1996, which is a continuation-in-part of application No. 08/659,143, filed on Jun. 5, 1996.

(51) Int. Cl.[7] .............................................. G06F 15/00
(52) U.S. Cl. .................... 358/1.12; 358/1.13; 358/1.15; 399/364; 399/384
(58) Field of Search ......................... 399/306, 307, 399/309, 350, 360, 111, 112, 114, 364, 384, 16; 346/139, 164, 262, 264; 395/111; 358/1.12, 1.13, 1.14, 1.15, 296

(56) References Cited

U.S. PATENT DOCUMENTS

| | | |
|---|---|---|
| 3,536,398 A | 10/1970 | Bhagat |
| 3,580,670 A | 5/1971 | Bhagat |
| 3,862,802 A | 1/1975 | Till .............................. 355/23 |
| 3,940,210 A | 2/1976 | Donohue |
| 3,944,359 A | 3/1976 | Fisk et al. |
| 3,944,360 A | 3/1976 | Deetz et al. |
| 4,120,034 A | 10/1978 | Fisk et al. |
| 4,194,832 A | 3/1980 | Tabayashi |
| 4,348,101 A | 9/1982 | Schonfeld et al. .......... 399/401 |
| 4,591,884 A | 5/1986 | Miyamoto et al. |
| 4,714,939 A * | 12/1987 | Ahern et al. ................ 399/360 |
| 4,774,524 A | 9/1988 | Warbus et al. |
| 4,796,066 A | 1/1989 | Morris et al. |
| 4,870,449 A * | 9/1989 | Brown ........................ 399/360 |
| 4,881,132 A | 11/1989 | Lajos |
| 4,958,187 A * | 9/1990 | Tsuchiya et al. ............ 399/306 |
| 4,972,236 A | 11/1990 | Hasegawa .................... 399/16 |
| 5,138,394 A * | 8/1992 | Watanabe et al. ........... 399/360 |
| 5,140,674 A | 8/1992 | Anderson et al. |
| 5,144,386 A | 9/1992 | Matsuo et al. .............. 399/381 |
| 5,179,417 A | 1/1993 | Sugaya et al. |
| 5,309,211 A * | 5/1994 | Yoshioka ..................... 355/298 |
| 5,349,427 A * | 9/1994 | Benedict et al. ............ 355/298 |
| 5,467,179 A | 11/1995 | Boeck et al. |
| 5,519,484 A * | 5/1996 | Kumagai ..................... 355/319 |
| 5,548,390 A * | 8/1996 | Sugisaki et al. ............ 355/319 |
| 5,568,246 A | 10/1996 | Keller et al. |
| 5,596,416 A | 1/1997 | Barry et al. |
| 5,670,995 A * | 9/1997 | Kupcho et al. ................ 347/5 |
| 5,688,057 A * | 11/1997 | Wright et al. ................. 400/82 |

* cited by examiner

Primary Examiner—Mark Wallerson
(74) Attorney, Agent, or Firm—R. Neil Sudol; William J. Sapone; Henry D. Coleman

(57) ABSTRACT

A printing apparatus has a desk-top printer housing having a paper input port, a paper output port and a data input port. A digital processor is disposed in the housing and is operatively connected to the data input port. The processor is programmed to detect odd pages and even pages in an electronically encoded document arriving via the data input port and to separate odd pages of the document from even pages thereof. A paper moving engine including rollers is disposed in the housing for moving a paper sheet through the printer housing from the paper input port to the paper output port along a predetermined path. A first laser printing assembly is disposed in the housing along one side of the path for printing an odd-numbered page of the document along one side of the paper sheet. A second laser printing assembly is disposed in the housing along an opposite side of the path for printing an even-numbered page of the document along an opposite side of the paper sheet. The processor is operatively connected to the laser printing assemblies for controlling the first laser printing assembly to print the odd-numbered page of the document along the one side of the paper sheet and for controlling the second laser printing assembly to print the even-numbered page of the document along the opposite side of the paper sheet.

15 Claims, 28 Drawing Sheets

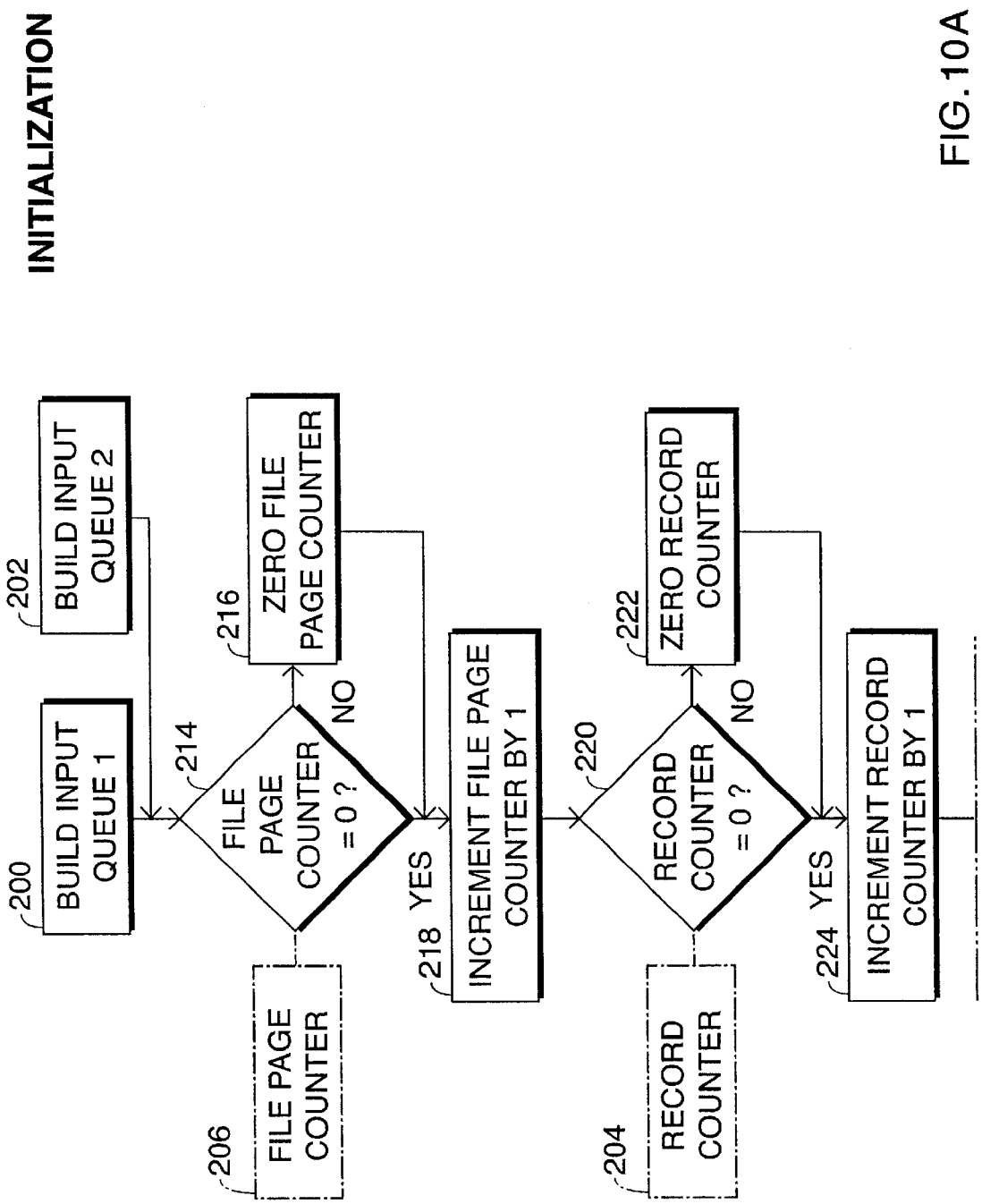

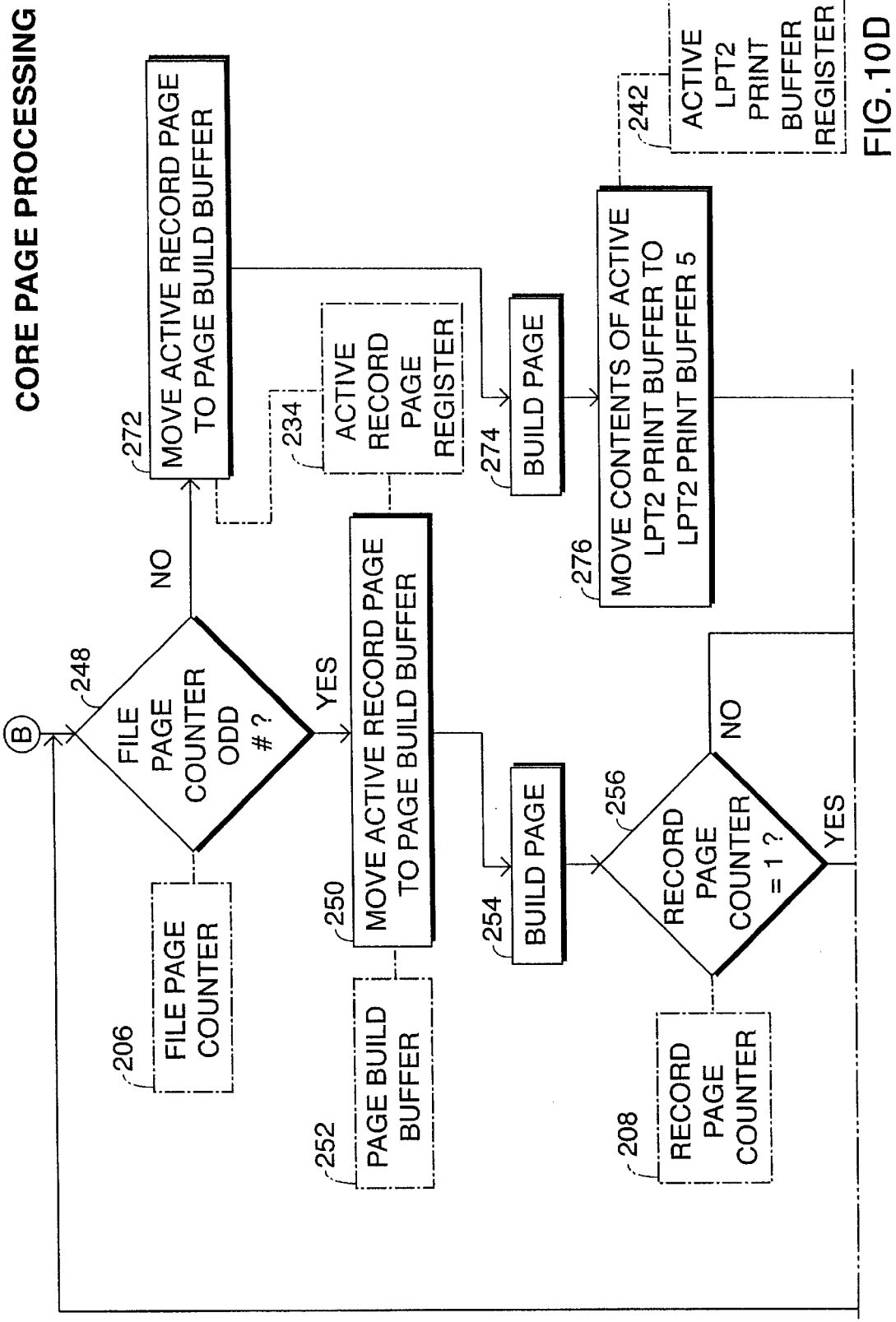

DESK-TOP PRINTER AND RELATED METHOD FOR TWO-SIDED PRINTING

CROSS-REFERENCE TO RELATED APPLICATIONS

This application is a continuation-in-part of application Ser. No. 08/659,143 filed Jun. 5, 1996, and a continuation-in-part of application Ser. No. 08/770,322 filed Dec. 20, 1996.

BACKGROUND OF THE INVENTION

This invention relates to an apparatus for two-sided printing. More particularly, this invention relates to a desk-top laser printer responsive to computer generated signals for printing a document on two sides.

At the present time, thousands of banks, brokerage houses and other financial institutions are printing millions of weekly, bi-weekly and monthly statements on one side of pre-printed statement forms. For the most part, these statements are printed off of mainframe or large-scale mini-computers. Affordable printers capable of handling mainframe and mini-computer output are either chain or dot-matrix printers. Consequently, printing both sides of paper having the conventional quality would masticate the paper.

Conventional two-sided photocopying and book printing present problems which have perhaps inhibited efforts to develop two-sided printing of financial type statements. Such problems include a warping of the paper which results from the high levels of heat employed. More moisture flees from the side of the paper in contact with the heated elements than from the more remote side of the paper. In addition, the deposition of electrostatic charges causes the paper sheets to cling to one another and to other surfaces. Both the warping of the paper sheets and the deposited electrostatic charge cause paper jams in the machinery. Avoiding or clearing the paper jams requires personnel to be present to monitor and correct problems as they occur. Sometimes, papers printed on one side are placed aside for flattening prior to printing on the opposite side. Such efforts increase costs and delay the production of the desired documents.

OBJECTS OF THE INVENTION

An object of the present invention is provide a printing system or apparatus for printing two-sided documents in response to computer-generated signals encoding the documents.

Another object of the present invention is to provide such a system or apparatus which can handle mainframe and other large-scale computer output.

A further object of the present invention is to provide such a system or apparatus which prints on each side of a sheet of paper in real time.

Yet another object of the present invention is to provide such a system or apparatus which can utilize laser printer technology and basic or conventional printer driver programming.

An additional object of the present invention is to provide such a system or apparatus which is simple to manufacture, assemble and implement.

These and other objects of the present invention will be apparent from the descriptions and drawings hereof

BRIEF DESCRIPTION

A printing apparatus comprises, in accordance with the present invention, a desk-top printer housing having a paper input port, a paper output port and a data input port. A digital processor is disposed in the housing and is operatively connected to the data input port. The processor is programmed to detect odd pages and even pages in an electronically encoded document arriving via the data input port and to separate odd pages of the document from even pages thereof. A paper moving engine including rollers is disposed in the housing for moving a paper sheet through the printer housing from the paper input port to the paper output port along a predetermined path. A first laser printing assembly is disposed in the housing along one side of the path for printing an odd-numbered page of the document along one side of the paper sheet. A second laser printing assembly is disposed in the housing along an opposite side of the path for printing an even-numbered page of the document along an opposite side of the paper sheet. The processor is operatively connected to the laser printing assemblies for controlling the first laser printing assembly to print the odd-numbered page of the document along the one side of the paper sheet and for controlling the second laser printing assembly to print the even-numbered page of the document along the opposite side of the paper sheet.

Preferably, the paper path is essentially linear. One of the laser printing assemblies is located above the path while the other laser printing assembly is located below the path.

Because the paper travels along a linear or straight path from one laser printing assembly to the other, the paper is easily aligned. There is less paper jamming and less paper warping than there would be in a printer with a curved paper path between the two laser print stations.

Because the laser print stations can be located essentially right next to one another, there is no need to provide the processor with multiple buffers for temporarily storing several pages. At most, a single output buffer is necessary to store one side of a page while the other side is being printed. Conventional RAM is sufficient to implement the output buffer.

It is to be noted that the laser printing assemblies are essentially identical to laser printing assemblies in conventional desk-top laser printers. Each laser printing assembly includes, for example, a drum having a photosensitive surface, a toner reservoir, a laser, a toner waste reservoir, an erase lamp, and a corona wire.

It is preferable that one laser printing assembly is located below the paper path while the other laser printing assembly is located in a more conventional position above the paper path. The laser printing assembly located above the paper path is essentially identical to existing laser printing assemblies. Moreover, only minor modifications are necessary to adapt a conventional laser printing assembly for disposition below the paper path. Generally, this second laser printing assembly is in an upside down configuration, with alterations in structure necessary to accommodate that inverted arrangement being made.

In accordance with a feature of the present invention, the two laser printing assemblies are mounted to a carriage which is movably disposed in the housing. Thus, the laser printing assemblies may be easily removed from the housing for servicing. One of the laser printing assemblies may be mounted to an upper side of the carriage, while the other laser printing assembly is mounted to an underside of the carriage. Accordingly, a toner cartridge of the one laser printing assembly is removed from above the carriage whereas a toner cartridge of the other laser printing assembly is removed from below the carriage.

Generally, it is contemplated that the laser printer apparatus has only one engine for moving the paper. The one engine is coupled to a sufficient number of rollers placed in appropriate locations to move the paper along the linear path past the first print station and subsequently the second print station and out the paper output port.

The processor is programmed to synchronize operation of the first laser printing assembly and the second laser printing assembly so that opposite sides of essentially every sheet bear consecutive pages. The processor is further programmed to generate the document from (1) encoded information peculiar to the document and (2) standard textual and graphic information incorporated into a plurality of documents.

A printing method in accordance with the present invention utilizes a desk-top laser printer for printing documents encoded in computer generated digital signals, the laser printer having two laser printing assemblies disposed in a single desk-top housing, the laser printer including a digital processor which is disposed in the housing and is operatively coupled to the printing assemblies. Pursuant to the inventive method, a multiple page document in digitally encoded form is transmitted to the processor via a data input of the laser printer. The processor is operated to detect odd pages and even pages in the document and to separate odd pages of the document from even pages thereof. A paper sheet is moved through the housing from a paper input port to a paper output port along a predetermined path, the printing assemblies being disposed along opposite sides of the path. One of the printing assemblies is energized, in response to a signal from the processor, to print an odd-numbered page of the document along one side of the paper sheet, while the other of the printing assemblies is energized, in response to another signal from the processor, to print an even-numbered page of the document along an opposite side of the paper sheet.

Where the laser printing assemblies are mounted to a carriage movably disposed in the housing, the method further comprises moving the carriage and the printing assemblies at least partially out of the housing for equipment servicing purposes. Where one of the printing assemblies is mounted to an upper side of the carriage and the other printing assembly is mounted to an underside of the carriage, the method also comprises removing a toner cartridge of the one of the laser printing assemblies from above the carriage and a toner cartridge of the other of the laser printing assemblies from below the carriage.

In accordance with another feature of the present invention, the processor is operated to control energization of the laser printing assemblies so that opposite sides of essentially every sheet sent through the laser printer portion bear consecutive pages.

The processor is operated to synchronize operation of the laser printing assemblies so that opposite sides of essentially every sheet sent through the laser printer bear consecutive pages. The processor is additionally operated to generate the document from (1) encoded information peculiar to the document and (2) standard textual and graphic information incorporated into a plurality of documents.

A printing system or assembly in accordance with the present invention is a high-volume printing system which can print customer data, e.g., on financial statements, in real time, using black and white laser printing technology and basic or conventional printer driver programming.

A printing system or assembly in accordance with the present invention reduces the number of sheets of paper necessary to print financial statements by 50% or more, concomitantly reducing printing and mailing costs. In addition, the system eliminates the need to use expensive pre-printed paper stock for financial statements. Logos may be printed on the front of each sheet in real time, while legal compliance information is printed only on the last face of a statement. The quality of the printed characters may be significantly improved over conventional methods of statement printing, up to the highest laser standards. Moreover, development costs can be substantially decreased through the utilization of existing (off-the-shelf) laser printer engines (preferably using powerful RISC processors).

A printing system or assembly for printing two-sided documents in accordance with the present invention can handle mainframe and other large-scale computer output. The printing occurs without essential delay (in real time) in response to computer generated signals. In contrast, in photocopying and other printing methods, there is a substantial delay between printing of one side and printing of the opposing side.

A system or assembly in accordance with the present invention utilizes laser printer technology and basic or conventional printer driver programming.

A laser printer for two-sided laser printing in accordance with the present invention does not require any memory space over and above that normally present in desk-top printers. The conventional RAM space is sufficient for the storage requirements of the present laser printer.

A laser printer for two-sided laser printing in accordance with the present invention is not size or speed sensitive and can be used in a wide range of printer powers and sizes. The two-sided laser printer is easy to maintain and repair. Paper handling is minimized. Accordingly, paper jamming and alignment problems are reduced.

A laser printer for two-sided laser printing in accordance with the present invention is useful for myriad applications, not just high-speed high-volume financial statements.

DESCRIPTION OF THE PREFERRED EMBODIMENTS

Figure 1:
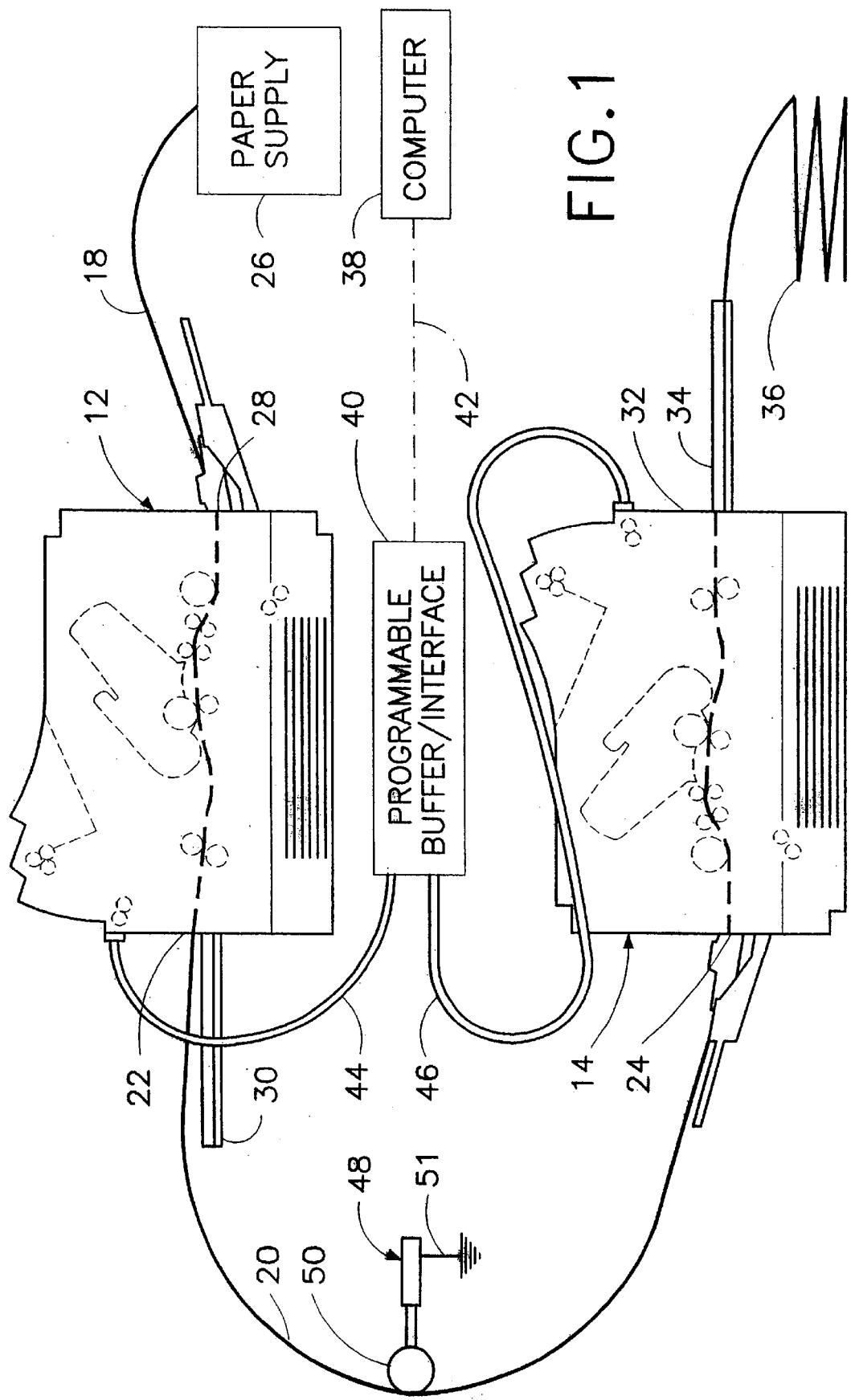
FIG. 1 is a schematic side elevational view, partly in block diagram form, of a printing system, showing two laser printers disposed in cascade with respect to one another.

As illustrated in FIG. 1, a printing assembly or system comprises a pair of printers 12 and 14 disposed one above the other, for example, on shelves of a cart or rack (not illustrated). Printers 12 and 14 are preferably laser printers for printing documents (alphanumeric characters, charts and graphics) encoded in computer generated signals. More specifically, printers 12 and 14 are off-the-shelf desk-top-type laser printers.

Printers 12 and 14 are connected in tandem to one another via a multiple-page continuous paper web 18 extending along a U- or C-shaped path 20 from a paper output port 22 of a first printer 12 to a paper feed port 24 of the second printer 14. Paper web 18 is stored in a Z-fold configuration (not shown) in a paper supply container 26 and is fed from that container to a paper feed port 28 of the first printer 12. A micro-switch sensor 29 is provided in printer 12 near paper feed port 28 for detecting whether paper web 18 is properly positioned.

Generally, web 18 comprises a series of sheet portions (not shown) connected end to end. Preferably, the sheet portions of web 18 each bear an end-of-page tab (not shown) at the trailing edge of the respective sheet portion. The end-of-page tabs are magnetically encoded, by means of the ink used to encode banking checks, and are detectible by an end-of-page sensor 31 disposed in printer 12 near paper output port 22 thereof.

At paper output port 22, a rear door 30 of the first printer 12 is unlatched and left in an opened configuration, to facilitate a guiding of paper web 18 along path 20 so that the paper turns from an upside-up to an upside-down orientation. Similarly, at a paper output port 32 of second printer 14, a rear door 34 of the second printer is kept opened to facilitate a feeding of the paper web 18 to a Z-fold stack 36. Printer 14 is provided with a micro-switch sensor 37 near paper feed port 24 for detecting whether paper web 18 is properly positioned, while an end-of-page sensor 39 is disposed in printer 14 near paper output port 32 thereof for detecting magnetically encoded end-of-page tabs at the trailing edges of the successive sheet portions of web 18. End-of-page sensors 31 and 39 replace the page break sensor (not illustrated) which is standard on laser jet printers. Of course, switches or other sensors (not shown) provided in printers 12 and 14 for disabling the printing process when doors 30 and 34 are opened are themselves disabled, bypassed or otherwise neutralized to enable the execution of printing operations.

As further illustrated in FIG. 1, the printing assembly or system also comprises a mainframe, desk-top, mini, or LAN server computer 38 which, in addition to other normal functions, generates a digital signal encoding a multiple page document such one or more ganged bank or financial statements. Computer 38 is coupled to printers 12 and 14 via a programmable buffer/interface 40. Buffer/interface 40 is connected at an input to computer 38 via a cable 42 for receiving, from the computer, the digital signal encoding the multiple page document. Buffer/interface 40 detects page breaks in the document and determines which pages are odd and which are even. Pursuant to that determination, buffer/interface 40 transmits odd pages to a data input of printer 12 over a cable 44 and even pages to a data input of printer 14 over a cable 46.

As additionally illustrated in FIG. 1, a tensioning device 48 is placed in contact with paper web 18 between paper output port 22 of printer 12 and paper feed port 24 of printer 14, for providing web 18 along path 20 with a predetermined amount of tension. Tensioning device 48 includes a spring loaded, electrically conductive roller 50 which is electrically grounded at 51 to remove electrostatic charge deposited on paper web 18 by printer 12. Tensioning device 48 may be designed to collapse upon experiencing pressure in excess of a predetermined safety limit. In that event, both printers 12 and 14 will be idled and an appropriate error condition will be displayed (see display 106, FIG. 5).

Figure 2:
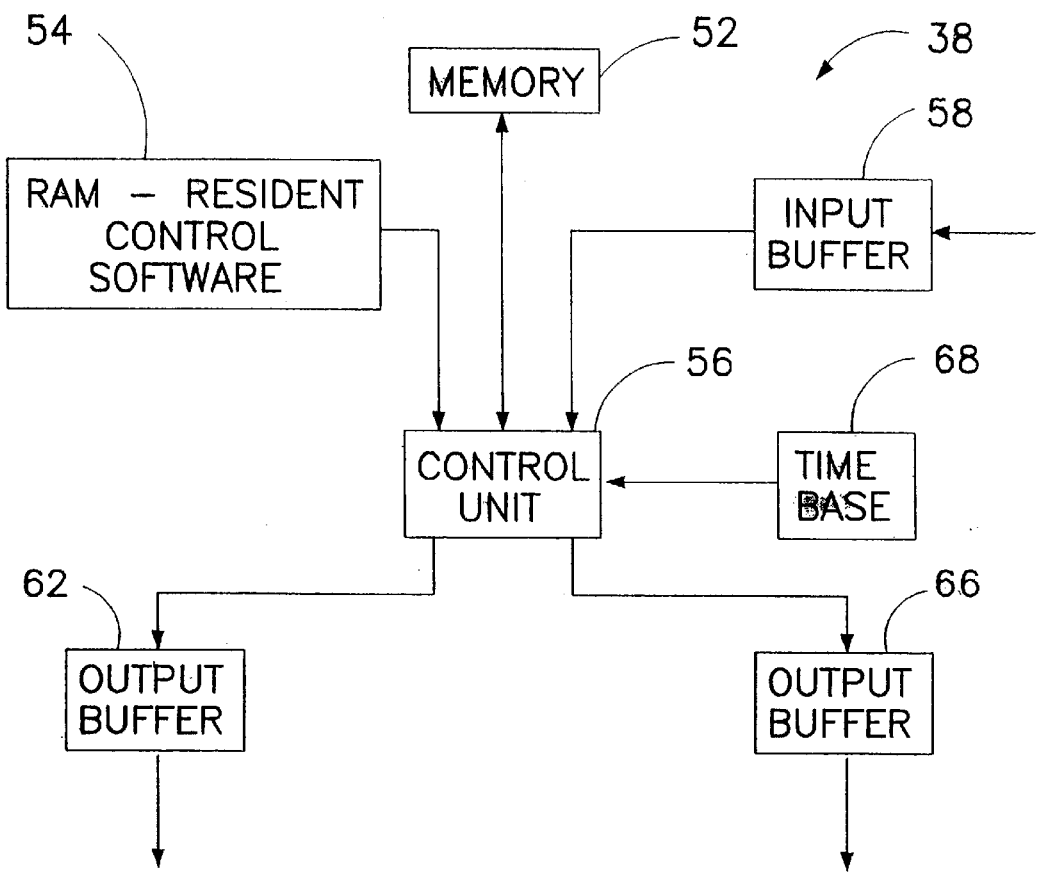
FIG. 2 is a block diagram of a programmable buffer/interface shown in FIG. 1.

As shown in FIG. 2, buffer/interface 40 includes a memory 52 which stores decoding instructions for different types of computers and different database programs. In response to instructions from RAM resident control software 54, a control unit 56 accesses memory 52 to enable the control unit to detect different pages of the multiple page document received by buffer/interface 40 from computer 38 over cable 42. The incoming multiple page document is temporarily stored in a buffer 58 which, together with cable 42, couples computer 38 to control unit 56.

Figure 3:
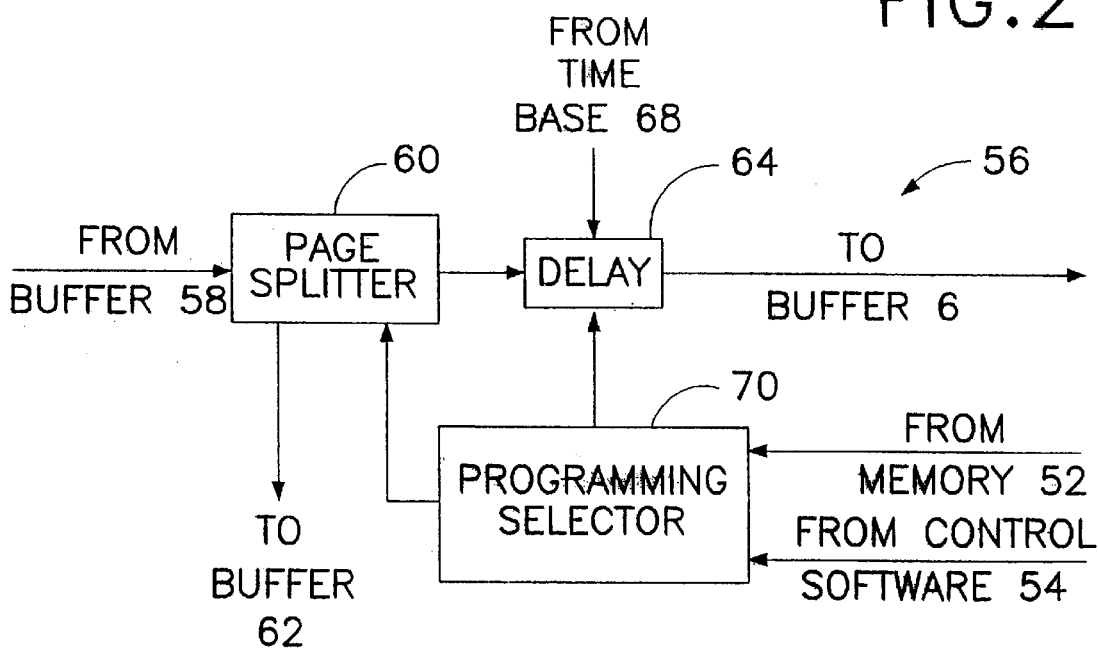
FIG. 3 is a block diagram of a control unit shown in FIG. 2.

As depicted in FIG. 3, control unit 56 includes a page splitting module 60 which detects and splits the odd pages from the even pages in the multiple page document generated by computer 38. Page splitter module 60 feeds the odd pages in sequence to printer 12 via an output buffer 62 (FIG. 2) and feeds the even pages in sequence to printer 14 via a delay 64 (FIG. 3) and an output buffer 66. Buffers 62 and 66, together with cables 44 and 46, couple page splitter module 60 to printers 12 and 14.

Under the control of a timing signal from a time base 68, delay 64 postpones the transmission of the even page sequence to printer 14 by an interval substantially equal to the transit time of paper web 18 from paper output port 22 of printer 12 to paper feed port 24 of printer 14, thereby synchronizing the operation of the two printers so that opposite sides of essentially every sheet of web 18 bear consecutive pages.

As further depicted in FIG. 3, control unit 56 includes a programming selector 70 which selects prestored document decoding instructions from memory 52 in response to a selection made by RAM-resident software 54. Software 54 senses and communicates to programming selector 70 the type of machine that computer 38 is or the type of operating system used by computer 38, as well as the identity of the database or word processing program which computer 38 uses to generate the multiple page document. This information permits control unit 56 and, more specifically, programming selector 70 and page splitter 60 to analyze the multiple page document for page breaks.

RAM-resident software 54 may also be used to inform control unit 56 of the type of printers connected to buffer/interface 40 and possibly an approximate distance along path 20 from output port 22 to paper feed port 24. The input of the approximate distance along path 20 enables control unit 56 to modify the timing of the second printer's operation relative to the first printer's operation. To that end, programming selector 70 is connected to delay 64, as depicted in FIG. 3.

Figure 4:
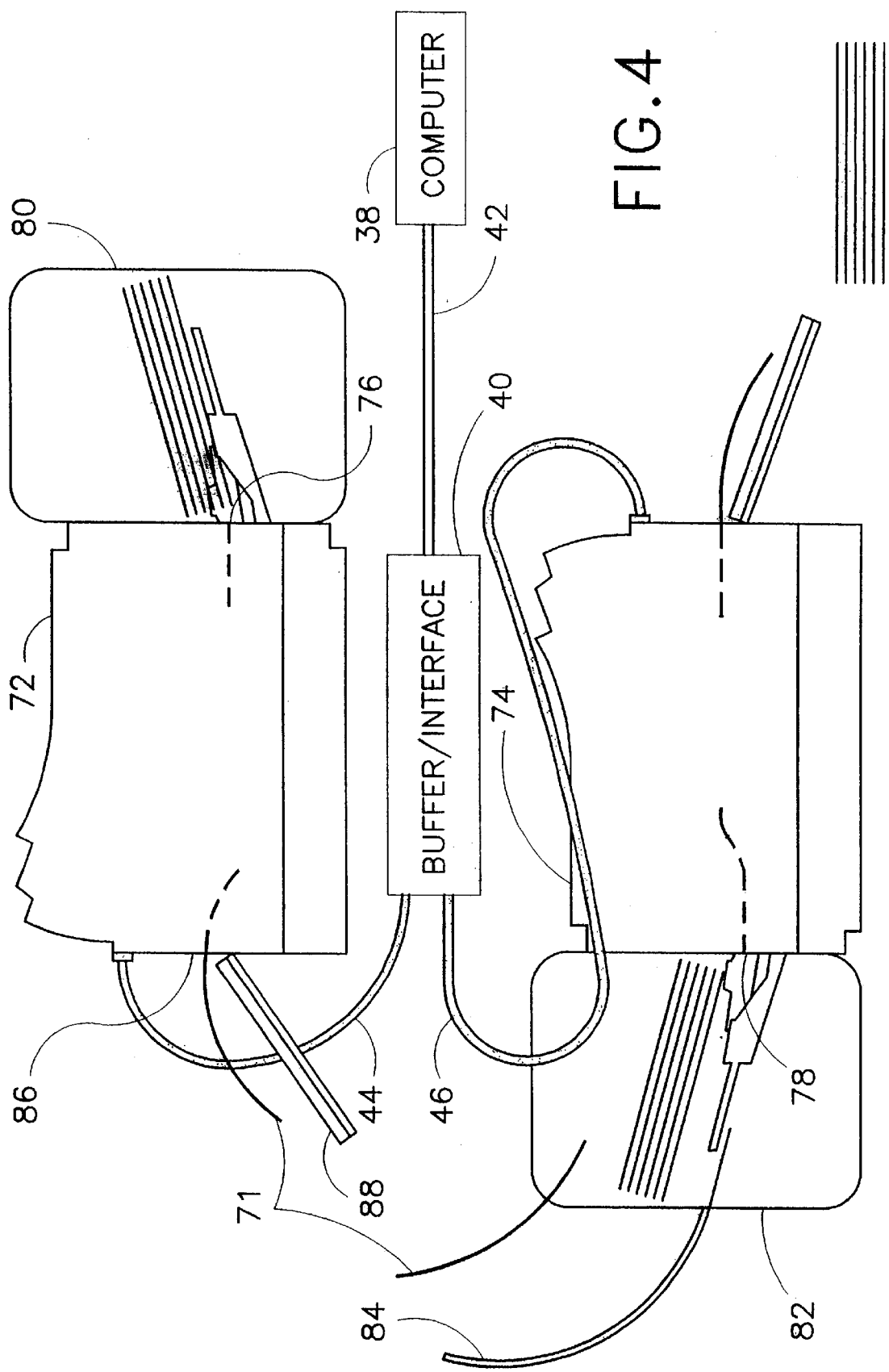
FIG. 4 is a schematic side elevational view, partly in block diagram form, of a modified printing system.

FIG. 4 illustrates another printing assembly or system for two-sided printing on separate paper sheets 71 comprises a pair of printers 72 and 74 disposed one above the other on shelves of a cart or rack (not illustrated). Printers 72 and 74 are essentially identical to printers 12 and 14 except that printers 72 and 74 are provided at their paper input ports 76 and 78 with respective paper stackers 80 and 82 and at their paper output ports 86 with standard page-break sensors (not shown), rather than end-of-page sensors 31 and 39 (FIG. 1). In addition, the second printer 74 is provided with an arcuate paper guide or surface 84 removably attached to paper stacker 82 for guiding paper sheets 71 from a paper output port 86 of printer 72 to stacker 82 so that the paper sheets are turned over in transit from output port 86 to input or feed port 78. A door 88 at output port 86 is angled downwardly and also serves a paper guiding function. Otherwise, the assembly of FIG. 4 is structurally essentially identical to the assembly or system of FIG. 1. Like reference numerals in FIGS. 1 and 4 denote identical structural components.

Figure 5:
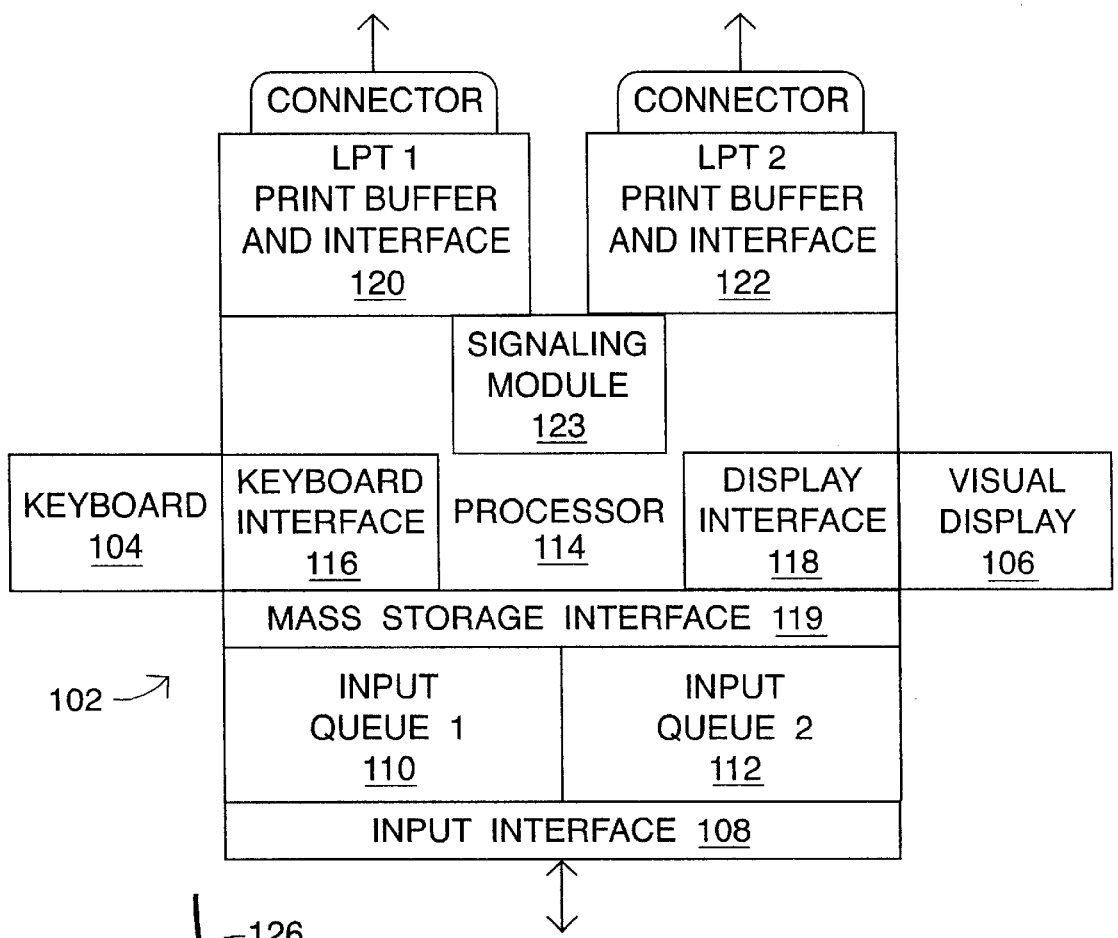
FIG. 5 is a block diagram of a computer unit utilizable to perform the functions of the programmable buffer/interface of FIGS. 1 and 4.

FIG. 5 depicts a computer unit 102 with a keyboard 104 and a visual display 106. Computer unit 102 is an alternative embodiment of the programmable buffer/interface 40 of FIGS. 1 and 4. Computer unit 102 includes an input interface 108 connected to mainframe, desk-top, mini, or LAN server computer 38 (FIGS. 1 and 4) for receiving therefrom a multiple page document such one or more ganged bank or financial statements. The incoming document is loaded into one of two mass storage components or input queues 110 and 112, under the control of a processor component 114 of computer unit 102. Processor 114 communicates with keyboard 104 and display 106 via respective interface modules 116 and 118 and with input queues 110 and 112 via a mass storage interface 119. Processor 114 includes an internal RAM (not illustrated) with resident control software.

Computer unit 102, more particularly, processor 114, performs several operations on a multiple page document which has been loaded into input queue 110 or 112. Processor 114 detects odd pages and even pages in the document, separates odd pages from even pages, and transmits odd pages of the document to laser printer 12 or 72 and even pages of the document to laser printer 14 or 74. Processor is additionally programmed to synchronize operation of the odd-page laser printer 12 or 72 and the even-page laser printer 14 or 74 so that opposite sides of essentially every sheet bear consecutive pages. It is also contemplated that computer unit 102 or processor 114 actively generates the ultimate printed pages by combining encoded information from computer 38 peculiar to a particular document with predetermined standard textual and graphic information incorporated into a plurality of different documents. For example, processor 114 will combine individual financial statement data such as banking transactions with standard text and graphics including logos, headings, dates and legally required information.

Processor 114 is programmed to delay page transmission to the even-page laser printer 14 or 74 by a predetermined number of pages. The length of the delay depends chiefly on the distance between the paper output port of the first printer and the paper infeed port of the second printer.

As further illustrated in FIG. 5, computer unit 102 also includes a first print buffer, LPT1 print buffer 120 (with interface), for temporarily storing a document page to be transmitted to the first laser printer 12 or 72. Five second print buffers 122 (with interface), individually labeled LPT2 print buffers A–E, are provided for temporarily storing a plurality of document pages to be transmitted to the second laser printer 14 or 74. Processor 114 has a signaling module 123 which interfaces with print modules 120 and 122.

Print buffers 120 and 122 are preferably areas of processor memory dedicated to output page storage. Print buffers 122 are one greater in number than the number of pages by which printing in the second printer 14 or 74 is delayed relative to the start of printing in the first printer 12 or 72.

Figure 6:
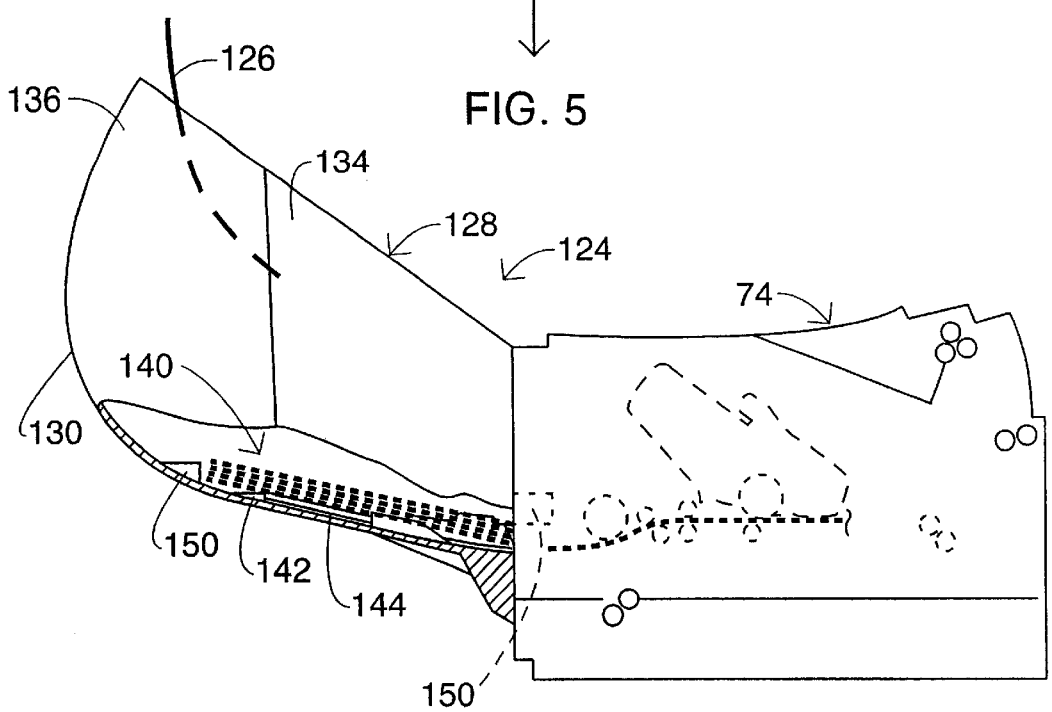
FIG. 6 is a schematic side elevational view of a modified second printer of a pair of ganged or cascaded printers shown in FIG. 4.
Figure 7:
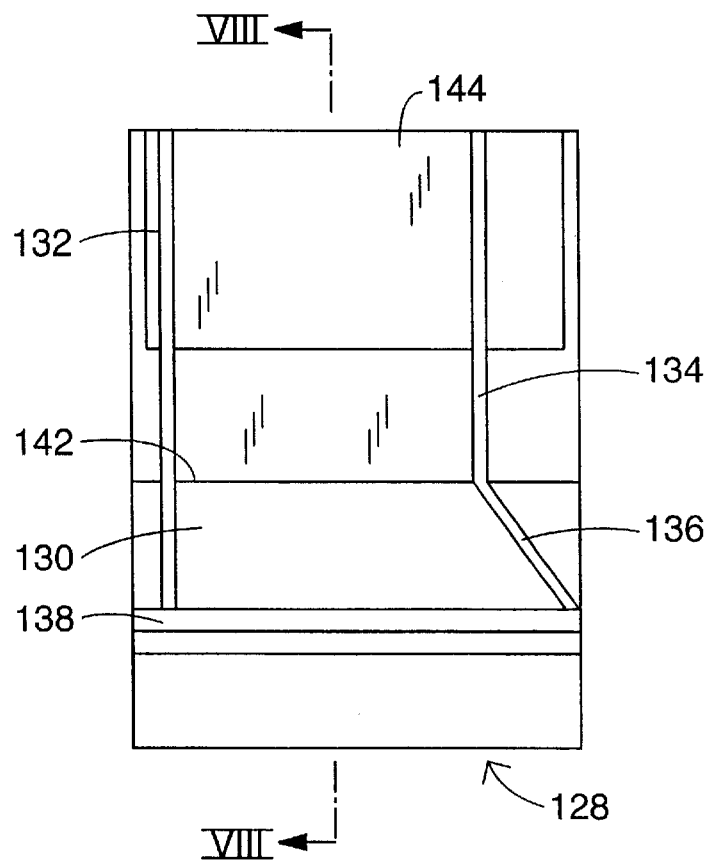
FIG. 7 is a schematic top plan view of a paper guide at a paper input port of the printer of FIG. 6.
Figure 8:
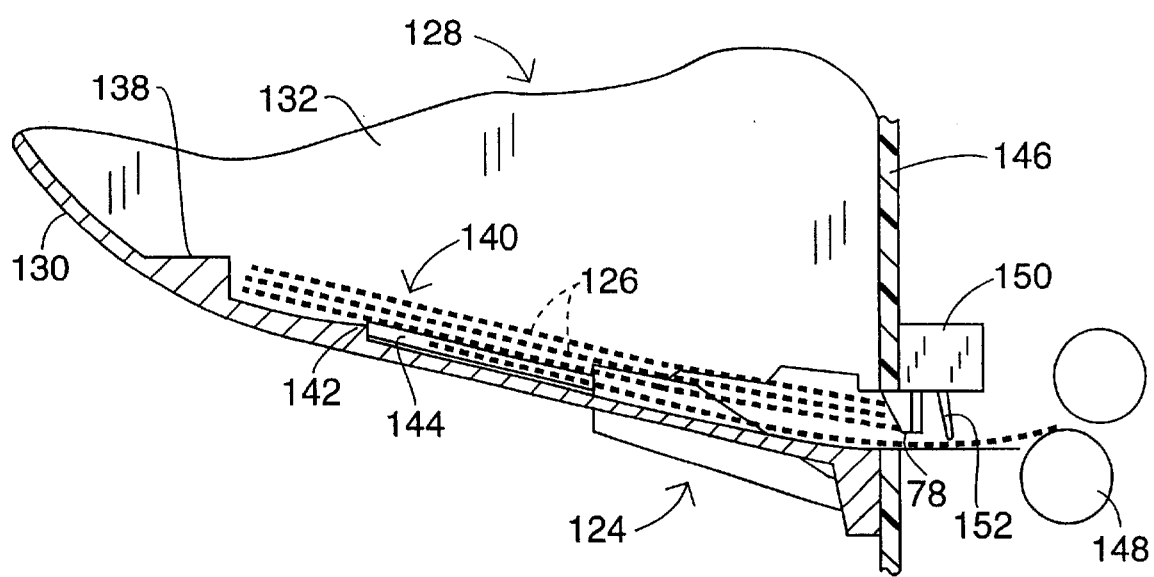
FIG. 8 is a schematic partial cross-sectional view taken along line VIII—VIII in FIG. 7, on an enlarged scale, showing the paper guide and paper infeed port of the printer of FIG. 6.

FIGS. 6–8 illustrate a modified paper infeed assembly 124 for printer 74. Sheets of paper 126 which drop from paper output port 86 of printer 72 (FIG. 4) are caught by a paper stacker or guide 128 attached to printer 74. Paper guide 128 includes an arcuate back and lower wall 130 and a pair of vertical side walls 132 and 134 (FIG. 7). Side wall 134 is laterally shiftable to accommodate paper sheets 126 of different widths. An upstream end portion 136 of side wall 134 is angled laterally outwardly to provide a "funnel" effect. Along an inner surface (not labeled) wall 130 is provided with a large step 138 defining the rear end of a stacking zone 140. Wall 130 is further provided along its inner surface with a small step 142 which abuts a rear edge of a pre-existing paper tray 144.

As shown in FIG. 8, paper sheets 126 are fed one sheet at a time through paper infeed port 78 (see also FIG. 4). Port 78 is just wide enough to accept one sheet only of twenty to twenty-eight pound laser printing paper. On an inner side of a printer rear wall 146 are disposed a gripper roller 148 and a sensor 150. Gripper roller 148 rises to pull a single paper sheet 126 through port 78. The infeed of that sheet is detected by sensor 150 via a pivoting of a trigger or microswitch lever 152. Upon the passage of a paper sheet 126 past roller 148 and sensor 150, trigger 152 falls and sensor 150 transmits a signal to the main electronic module (not illustrated) of printer 74. The main electronic module in turn signals gripper roller 148 to shift to a lowered position to enable gravity feed of the next paper sheet.

Figure 9:
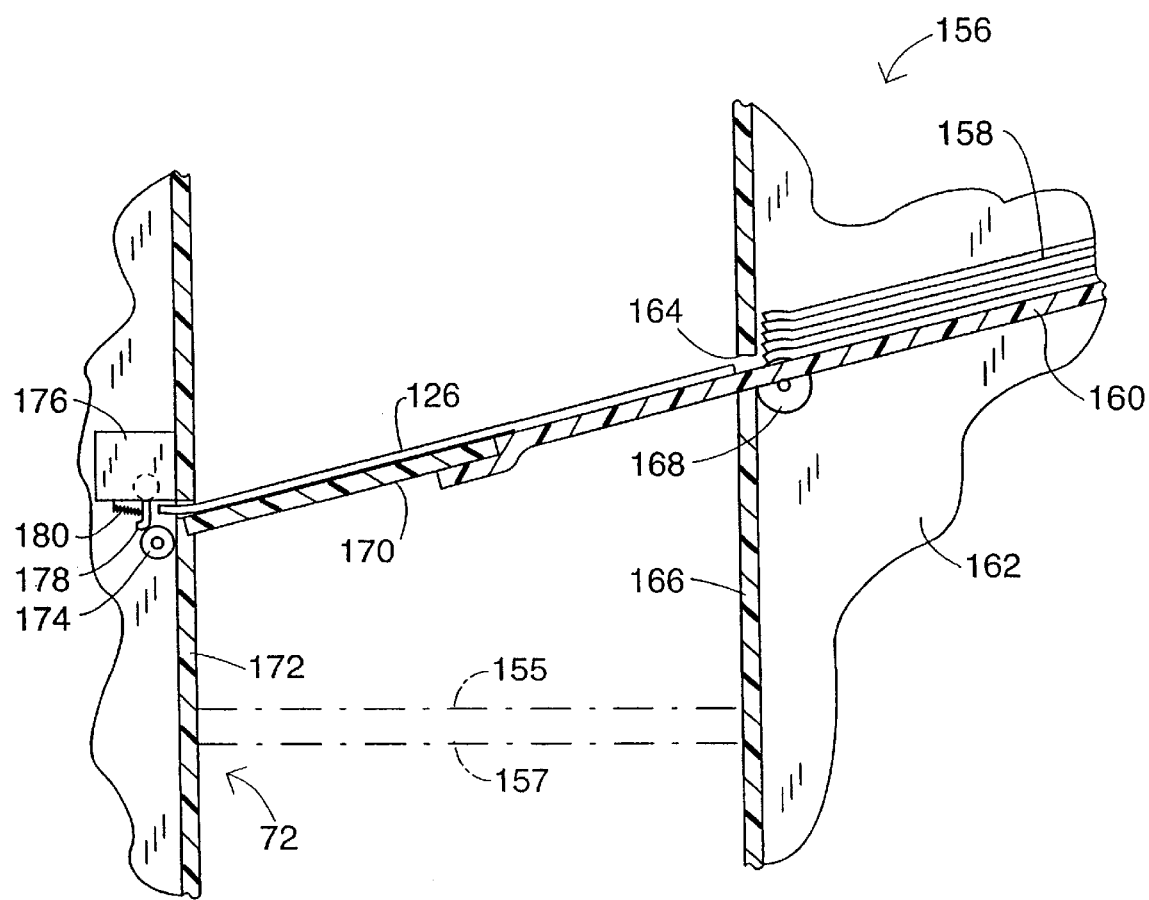
FIG. 9 a schematic partial cross-sectional view, on an enlarged scale, of a modified paper supply or stacker, a paper guide, and a paper infeed port of a first printer of the pair of ganged or cascaded printers of FIG. 4.

FIG. 9 illustrates a portion of a modified paper supply or stacker 156 provided at an input to printer 72 (see also FIG. 4). Stacker 156 is electrically connected to printer 72 via a power cable 155 and a signaling cable 157. A stack 158 of paper sheets 126 is disposed on a feed ramp or guide plate 160 of a stacker frame 162. The paper sheets 126 are delivered one at a time through an opening or slot 164 between a front face 166 of stacker frame 162 and feed ramp 160. In response to a signal from the main electronics (not shown) of printer 72, a motor-driven gripper roller 168 feeds a single paper sheet 126 through opening or slot 164. Under the control of the main electronics of printer 72, gripper roller 168 is lowered to position the next sheet for feeding and subsequently raised to prevent the next sheet from slipping down into the feed path.

At a lower end, feed ramp 160 abuts an upper end of a printer paper tray 170. Paper tray extends to a paper input port 76 (see also FIG. 4) where, on an inner side of a printer panel 172, are disposed a gripper roller 174 and a sensor 176 with a trigger 178 loaded by a coil spring 180. Gripper roller 174 and sensor 176 function similarly to roller 148 and sensor 150.

Figure 10B:
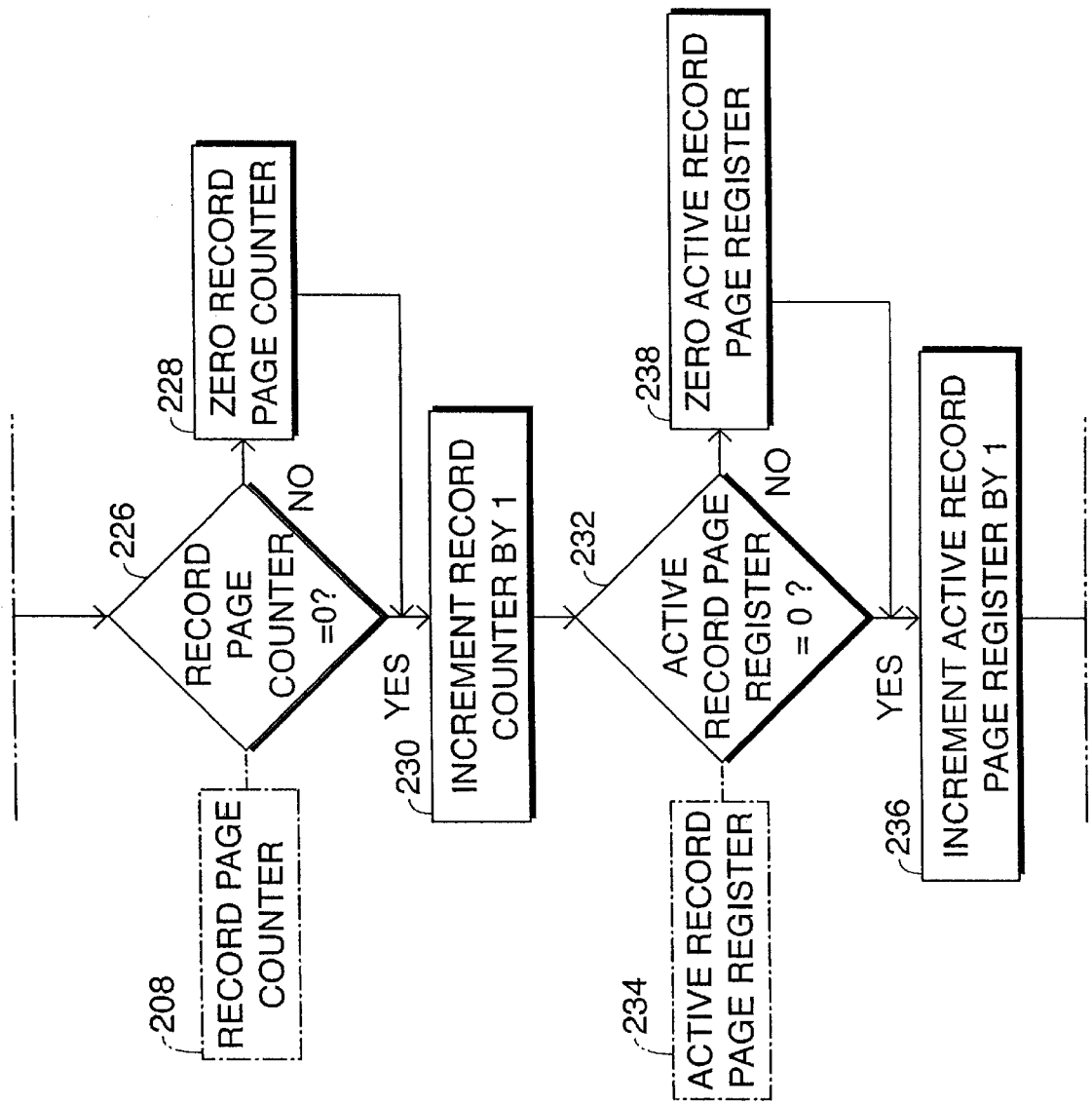
FIGS. 10A–10H are interconnected portions of a block diagram illustrating operations of the computer unit of FIG. 5, and more particularly a processor component of the computer unit.
Figure 10C:
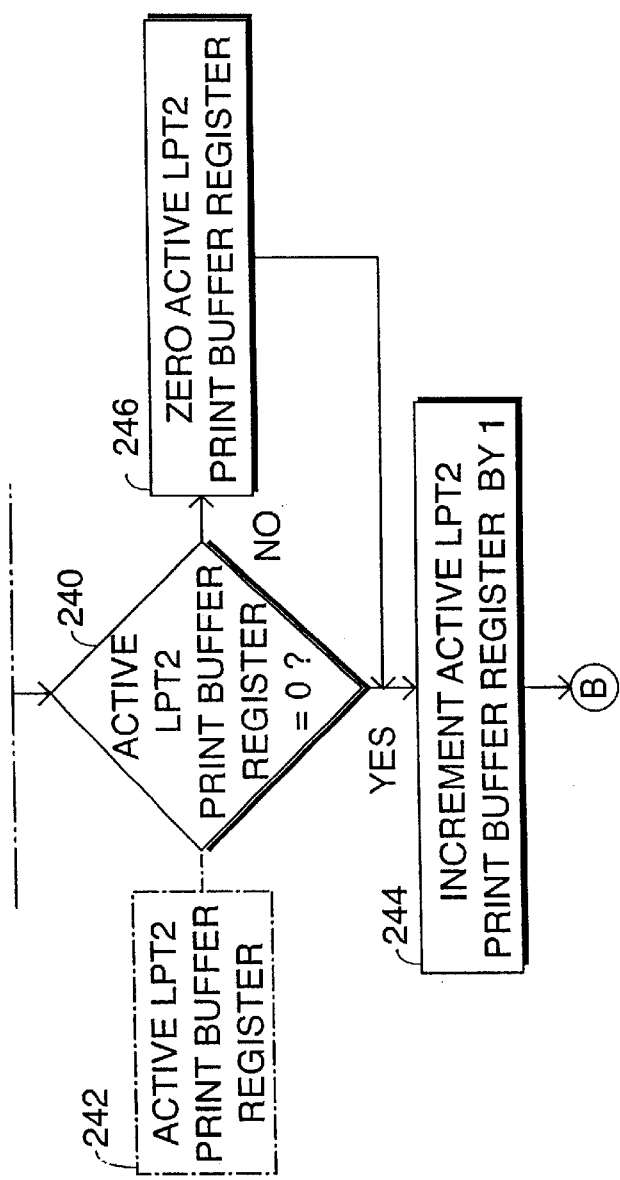
Figure 10E:
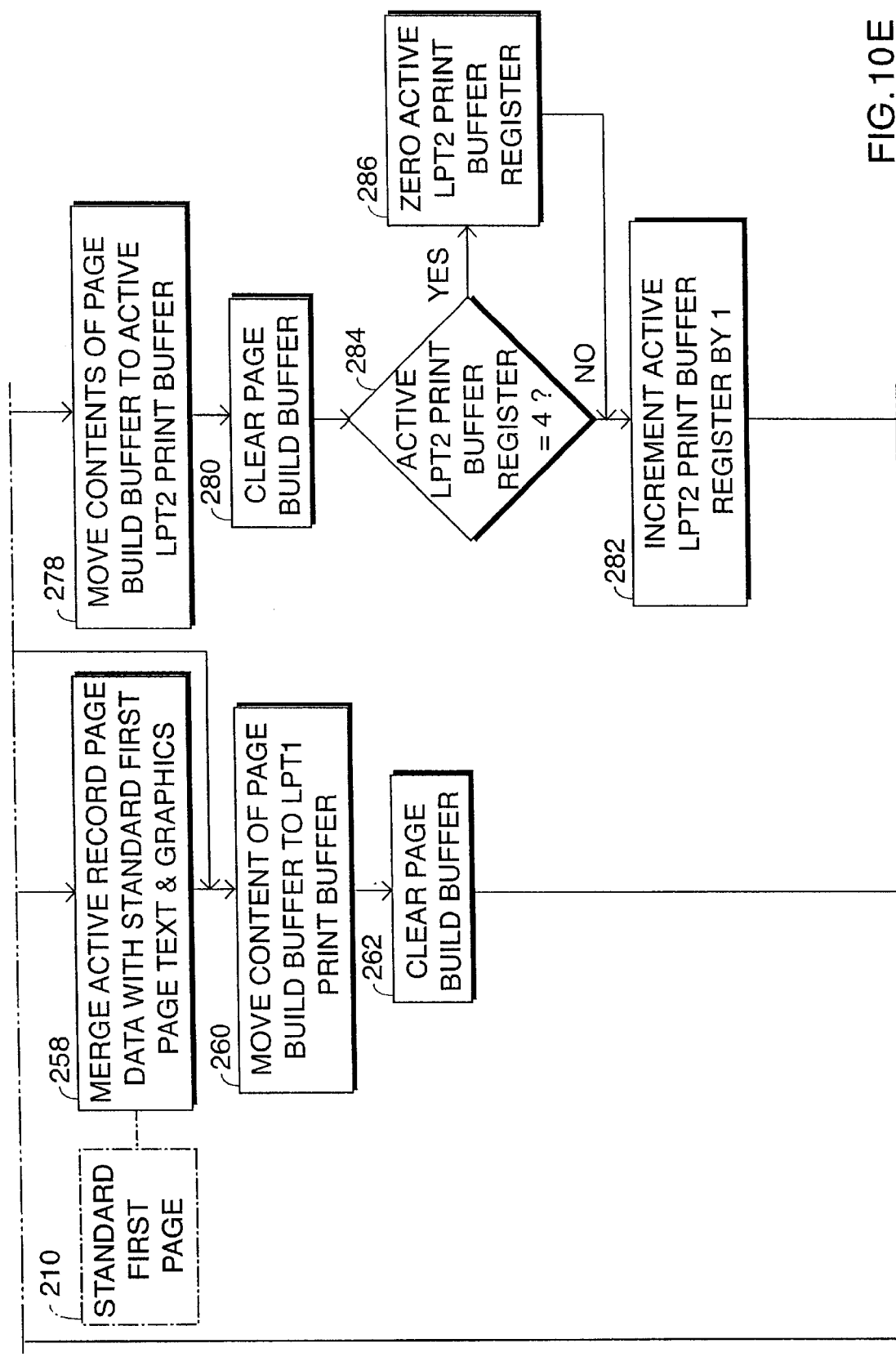
Figure 10F:
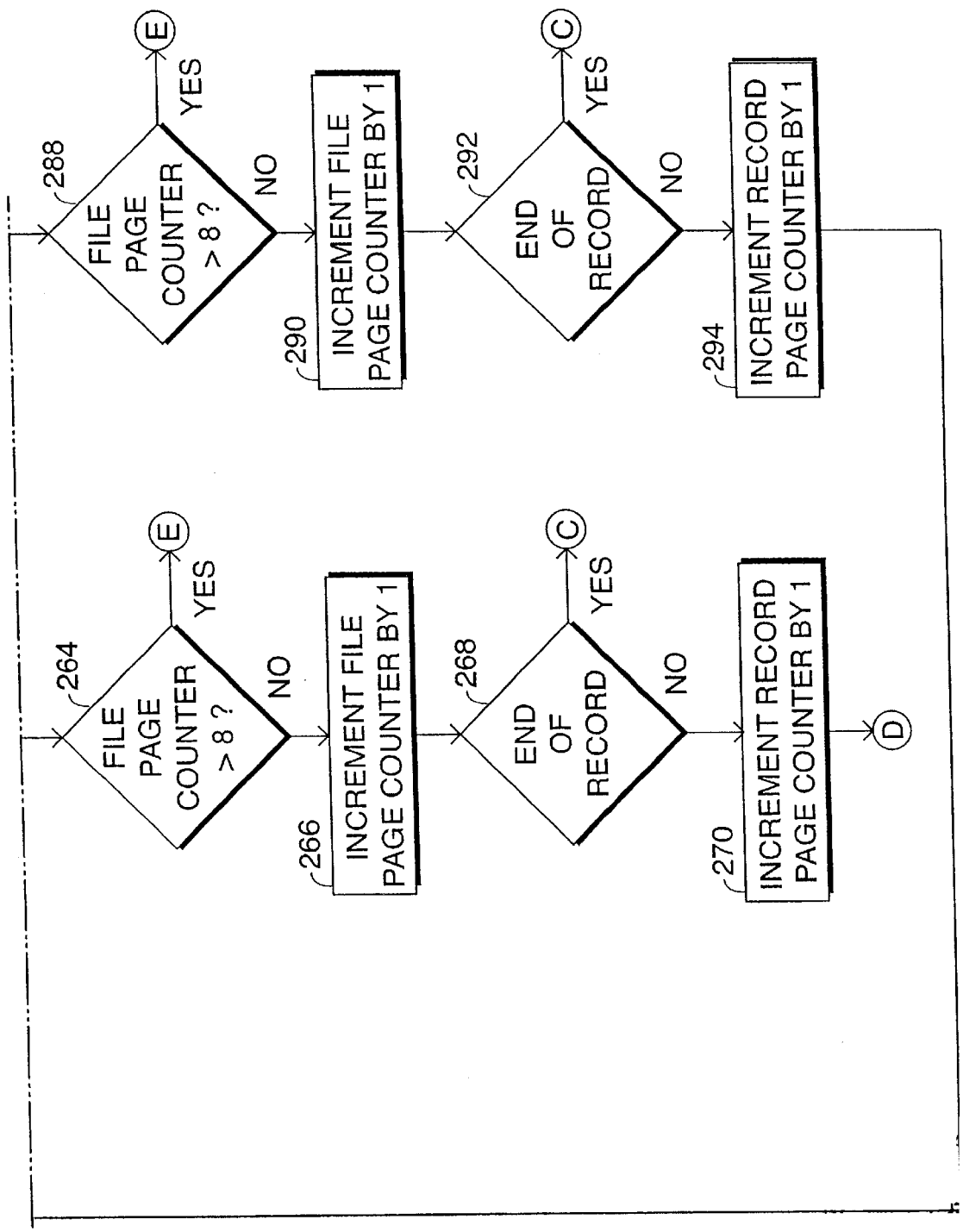
Figure 10G:
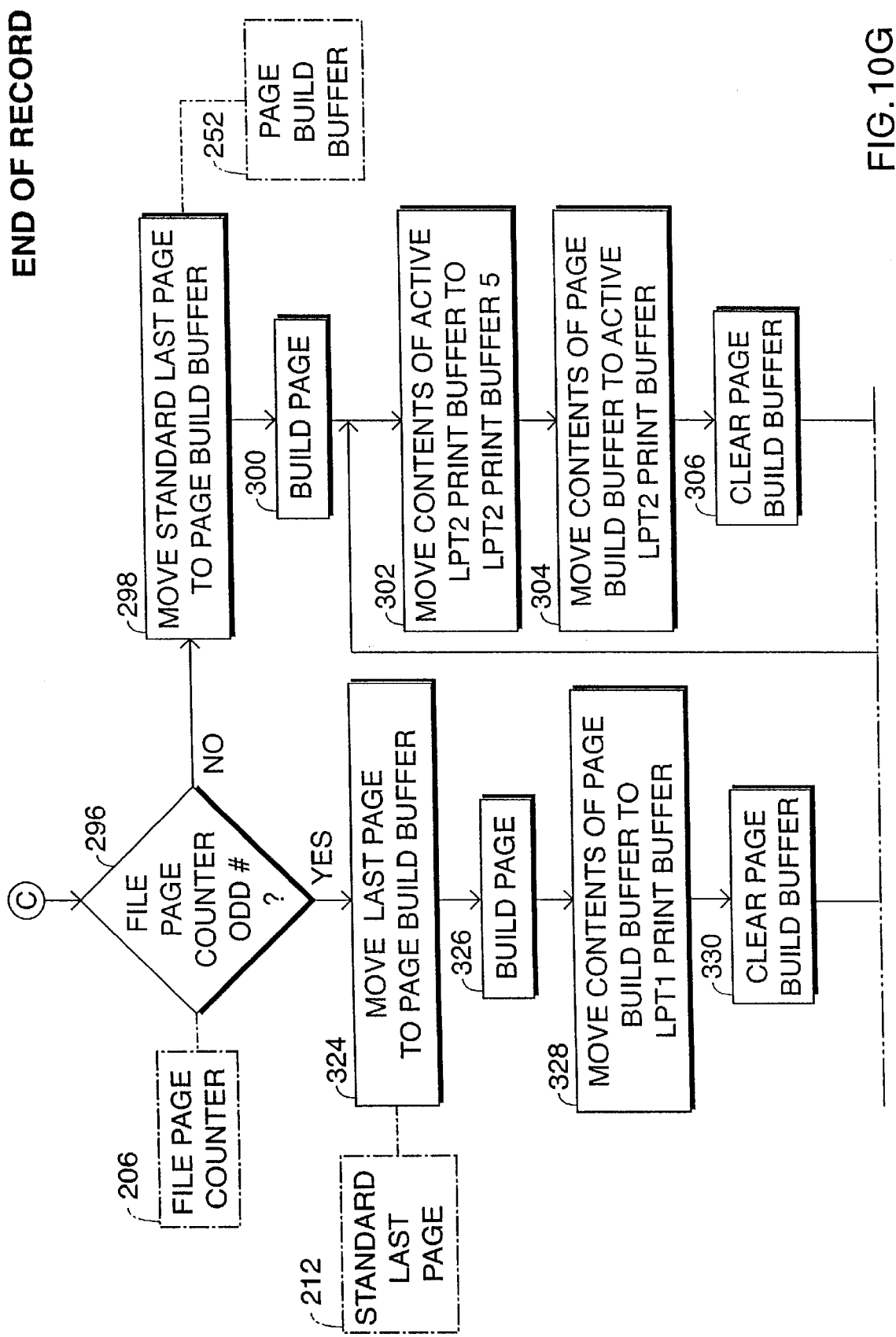
Figure 10H:
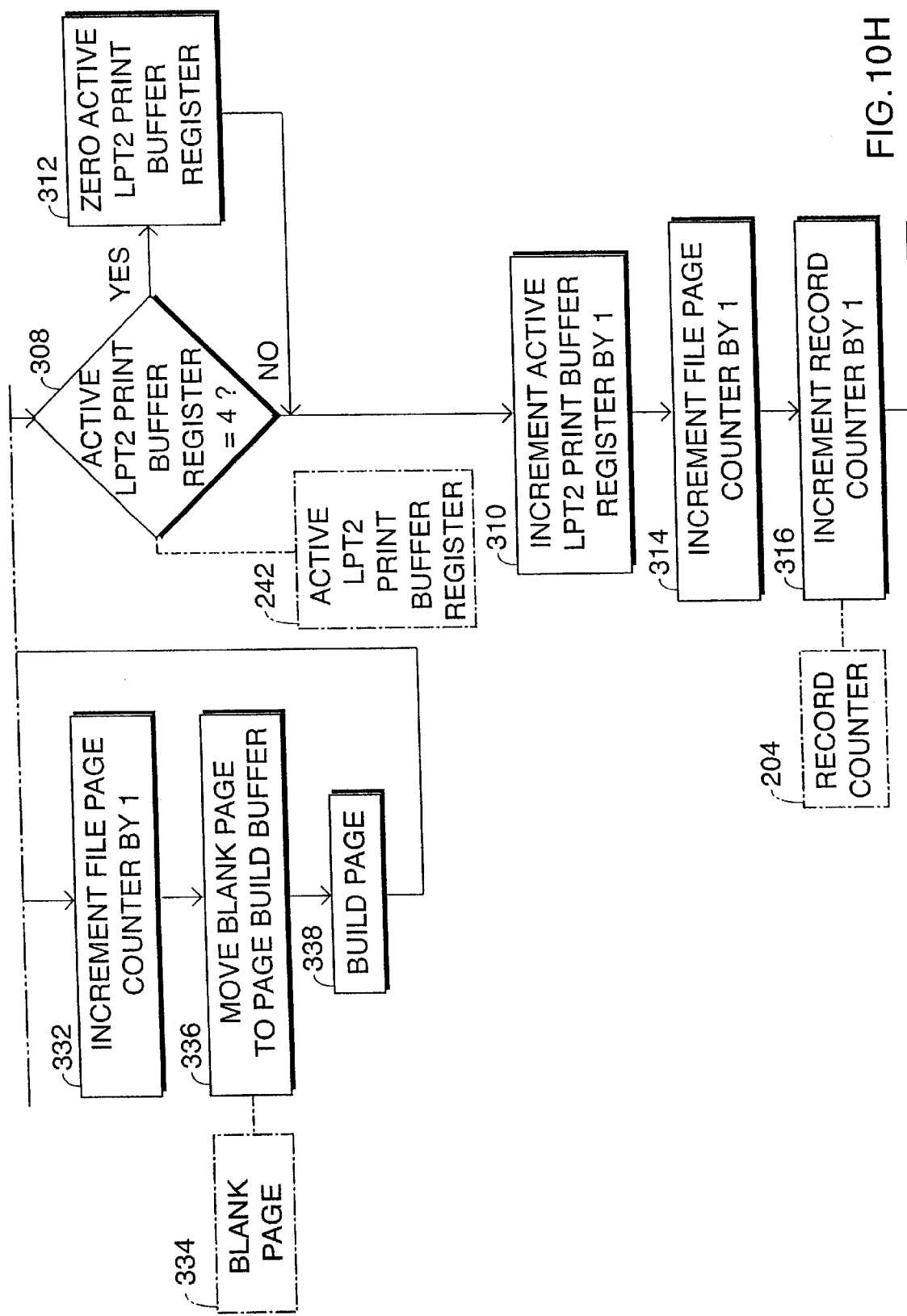
Figure 10:
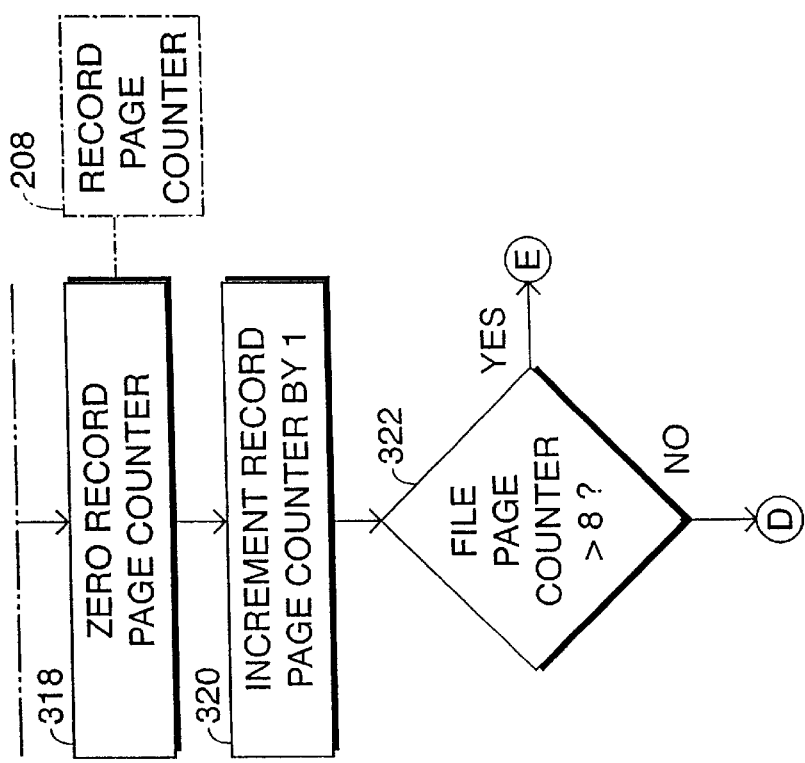
Figure 10J:
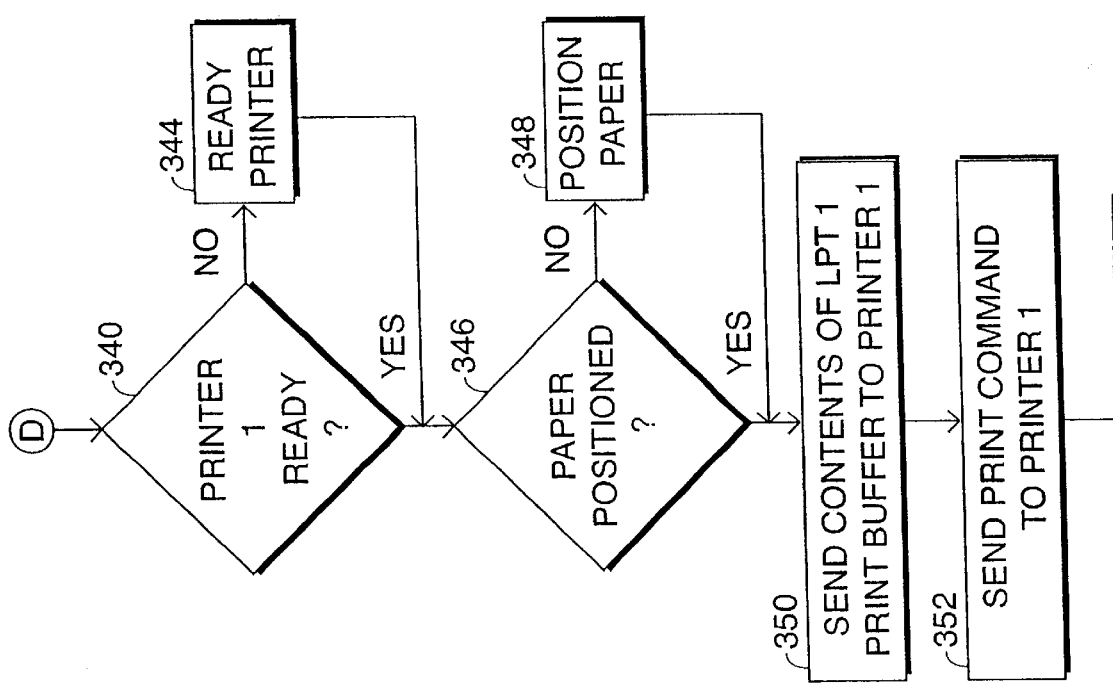
Figure 10K:
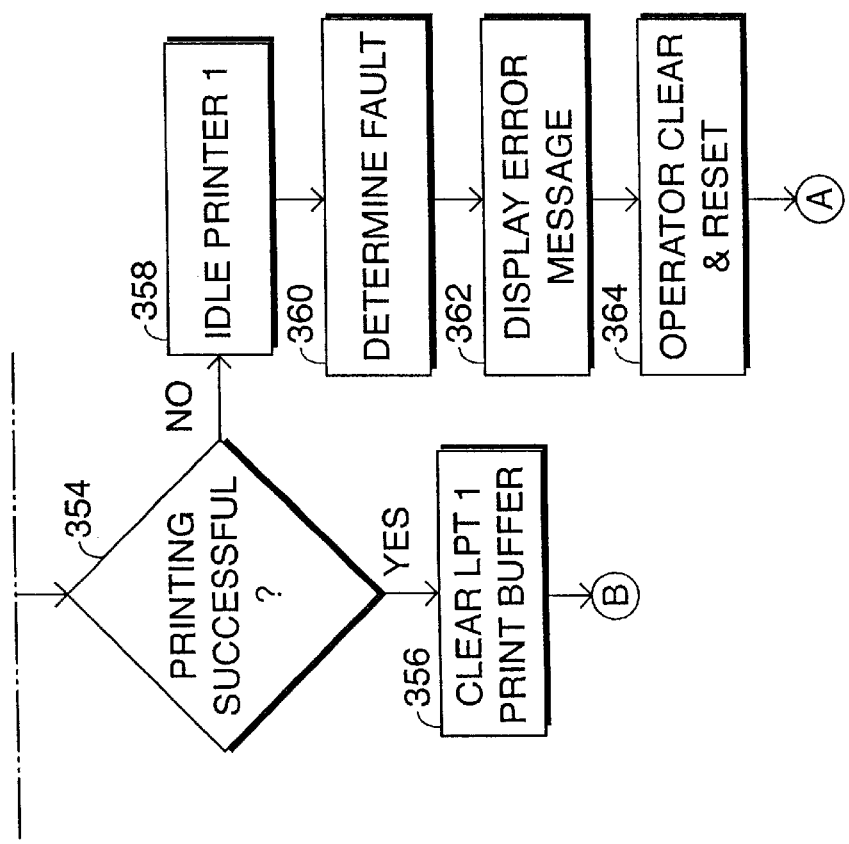
Figure 10L:
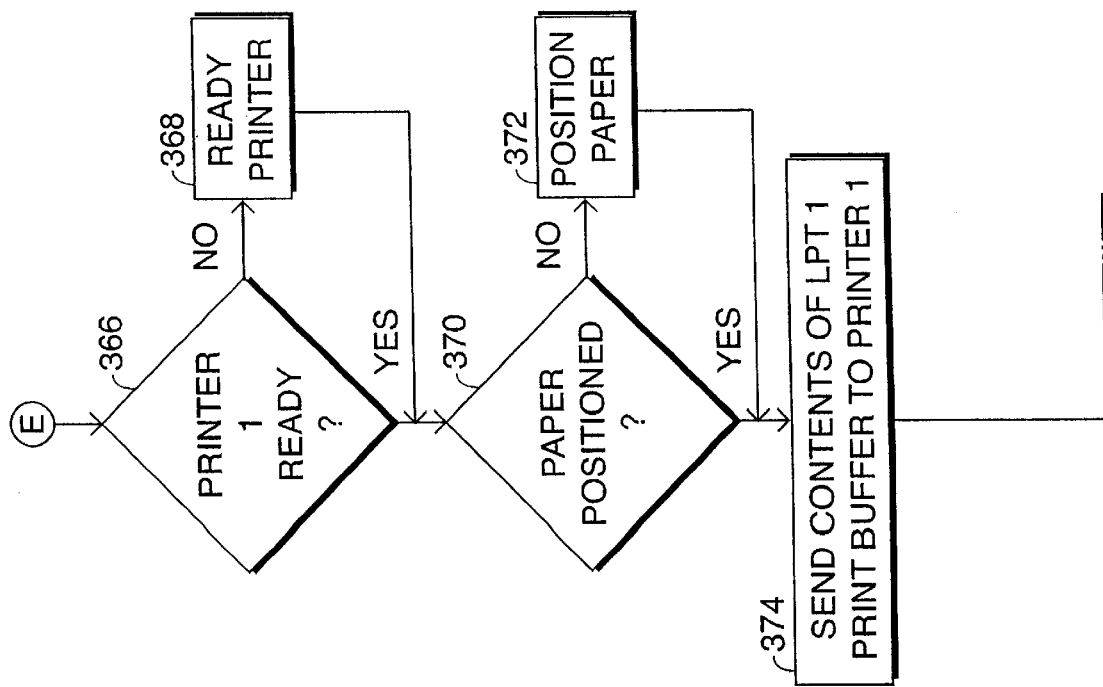
Figure 10M:
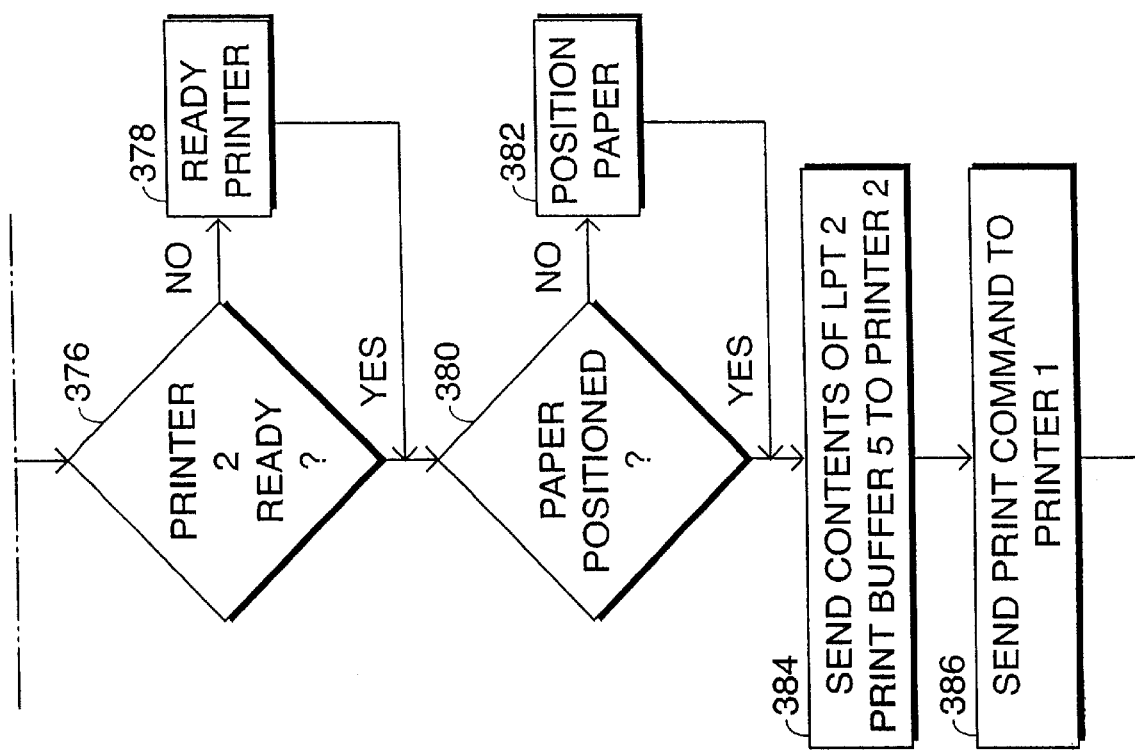
Figure 10N:
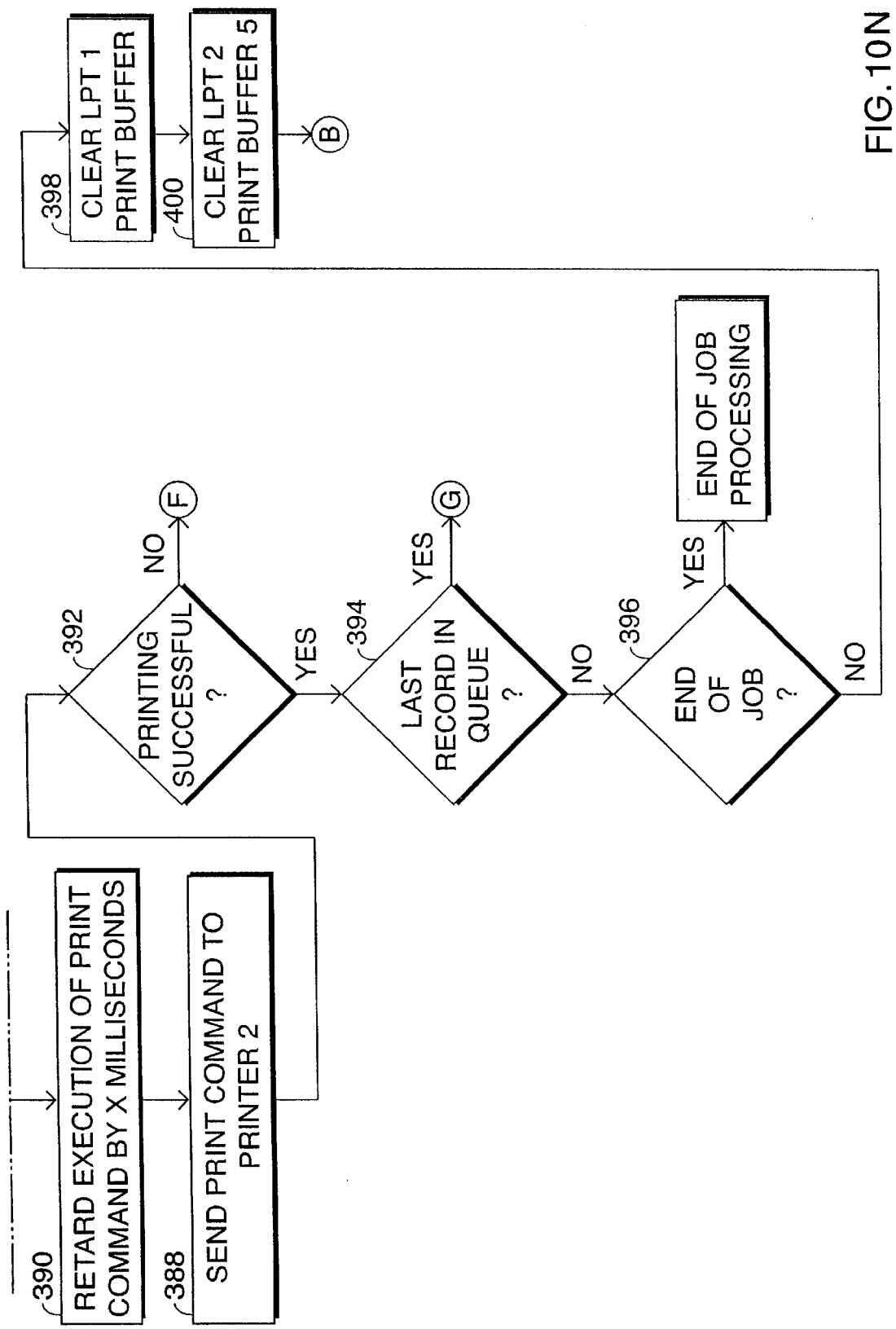
Figure 10O:
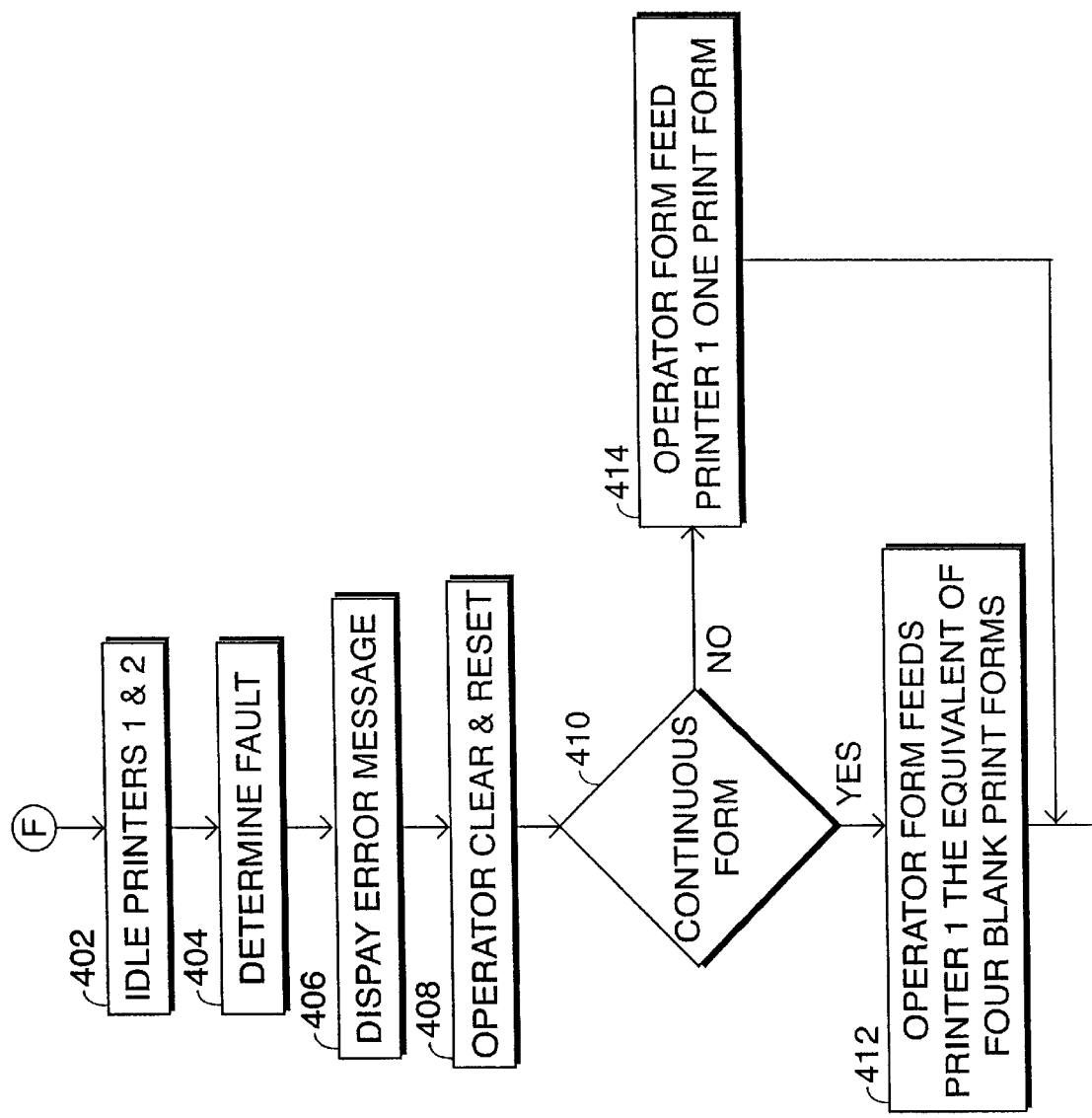
Figure 10P:
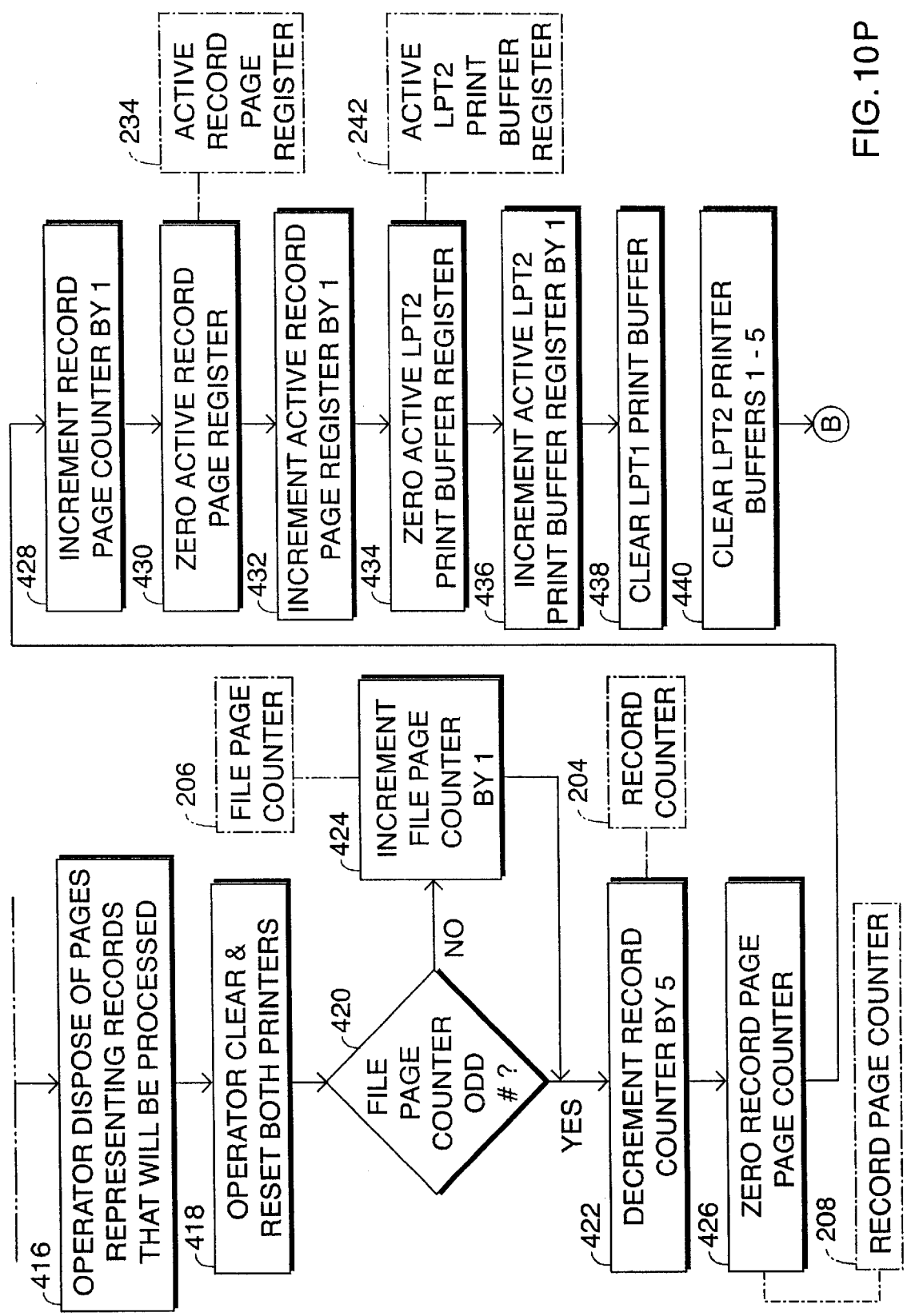
Figure 10Q:
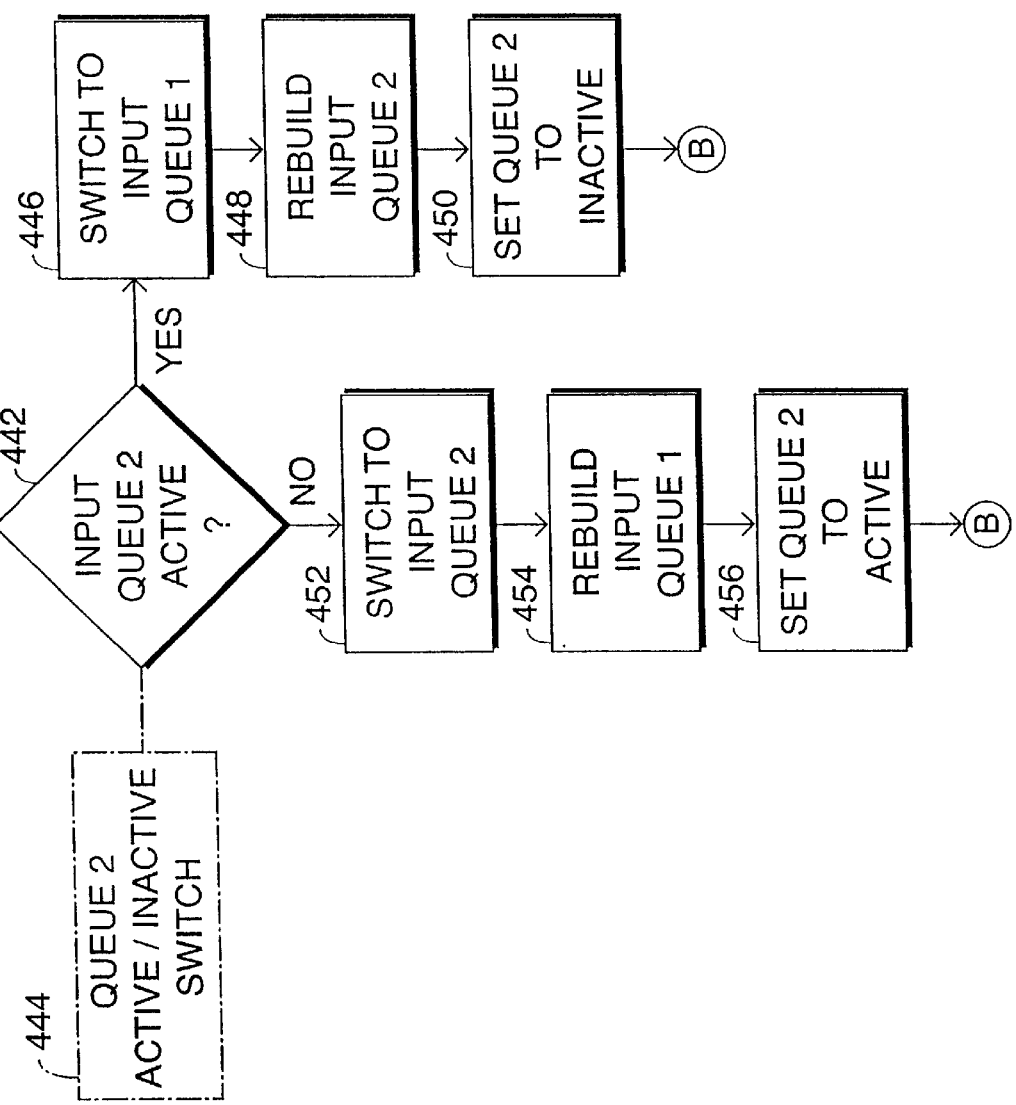
Figure 10R:
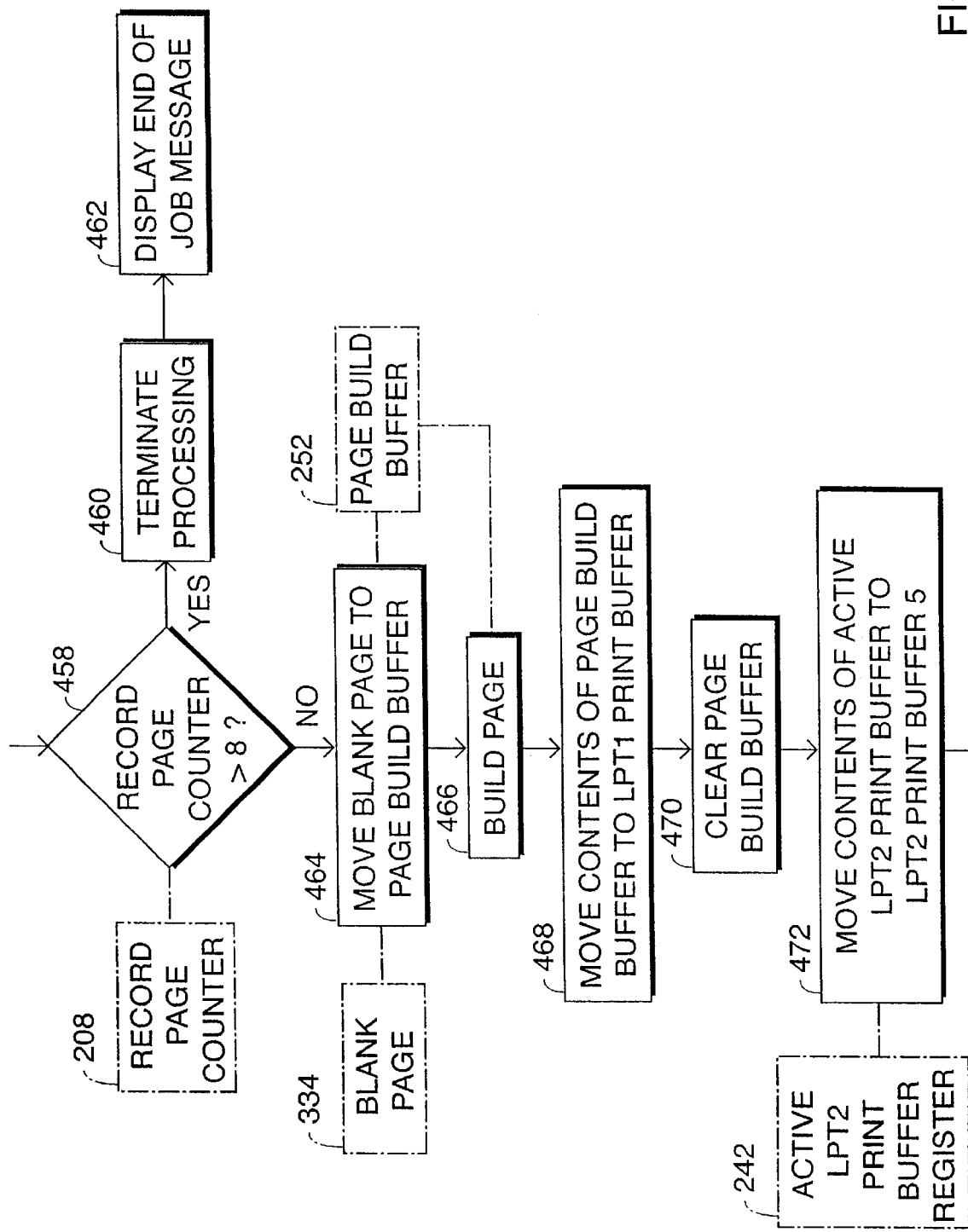
Figure 10S:
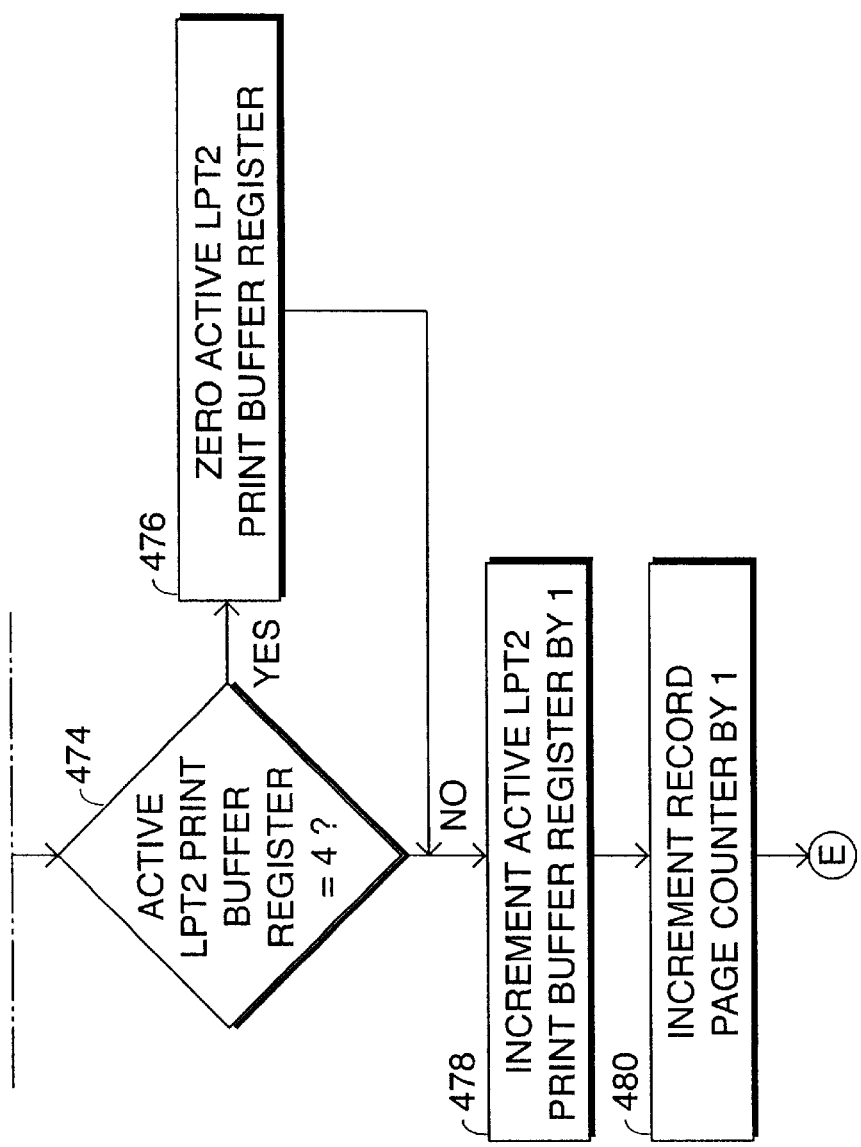

FIGS. 10A–10H generally illustrate respective subroutines in the operation of processor 114. FIG. 10A relates to general initialization procedures. FIG. 10B concerns core page processing operations. FIG. 10C is directed to steps undertaken at the end of each record in a print file. FIG. 10D depicts printing operations using just one printer (for example, during the first several pages of a pint job). FIG. 10E involves printing operations utilizing both printers. FIG. 10F relates to procedures for correcting printing errors. FIG. 10G deals with steps performed at the last record of a print file. FIG. 10H shows processing operations at the end of a print job.

Upon initialization, processor 114 oversees the loading of print files into queues 110 and 112 (FIG. 5), as indicated at steps 200 and 202 in FIG. 10A. Each print file includes a multiplicity of documents or records. In the printing of bank financial statements, the records constitute lists of bank financial transactions which have occurred during a month period (the statement period). Each record includes at least one page of the print file and more frequently includes more than one page. Processor 114 must track the succession of records as they are being printed. To that end, processor 114 has a record counter 204 (see FIG. 10A) in a defined area of internal memory. For each page to be printed, processor 114 must also track the file page number and the record number. Accordingly, processor 114 has a file page counter 206 and a record page counter 208 as reserved areas of internal memory.

Among the operations executed by processor 114 are (1) merging standard text and graphics, stored in internal memory areas 210 (FIG. 10B) and 212 (FIG. 10C), with the individual record data, (2) determining the first and last page of each record in a print file, (3) synchronizing or timing the printing in the two printers 12, 14 or 72, 74, and (4) transmitting print data to the printers to enable printing. As mentioned above, the main subroutine for controlling the printing operations is illustrated in FIG. 10E, while print initialization operations are shown in FIG. 10D. The synchronization or timing of printing in the two printers 12, 14 or 72, 74 is accomplished by using LPT2 buffer registers 122 (FIG. 5) to delay the feeding of even pages to the second printer 14 or 74 essentially by the time required for a paper sheet to travel from paper infeed port 28 or 76 of the first printer 12 or 72 to the paper infeed port 24 or 78 of the second printer 14 or 74. The delay thus depends in part on the speed of printing in the first printer 12 or 72 but also depends on the distance between the paper output port 22 or 86 of the first printer 12 or 72 and the paper infeed port 24 or 78 of the second printer 14 or 74. The steps taken to synchronize or time printing operations in the two printers 12, 14 or 72, 74 are included in the core page processing subroutine of FIG. 10B.

Upon beginning print operations for a job loaded into queue 110 or 112, processor 114 checks on the contents of file page counter 206 at an inquiry 214, as illustrated in FIG. 10A. If the contents are non-zero, processor 114 zeroes the contents in a step 216. Once the contents of file page counter 206 are determined to be zero, the contents are then incremented by one in a step 218. Processor 114 then engages in an inquiry 220 into the contents of record counter 204. If the contents are not zero, the processor resets counter 204 in a step 222. The contents of record counter 204 are then augmented by one in a step 224. Subsequently, processor 114 investigates at 226 the contents of record page counter 208. Non-zero contents are cleared away in a step 228 and the contents of record page counter 208 are then increased by one in a step 230. Processor 114 then makes a check 232 into the contents of an active record page register 234. If the contents of that register are zero, processor 114 increments the contents by one in a step 236. If, however, the contents are determined in check 232 to be non-zero, processor clears register 234 in a step 238 and then proceeds to incrementation step 236. In a final inquiry 240 of the initialization subroutine of FIG. 10A, processor 114 determines whether the contents of a print buffer register 242 are zero. If so, the contents of register 242 are stepped up by one at 244. If not, register 242 is first reset in a step 246.

The contents of register 242 indicate which print buffer A–E of LPT2 buffer registers 122 is currently active, i.e., ready to receive a built-up even-numbered page for temporary storage to implement the delay between printing operations in the first printer 12 or 72, on the one hand, and printing operations in the second printer 14 or 74, on the other hand. During active printing operations, the contents of active LPT2 print buffer register 242 vary from one to four (A through D), where there is a four page delay between printing operations in the two printers. Like counters 204, 206, and 208, registers 234 and 242 are implemented as respective memory cells or locations internal to processor 114.

Upon the proper initialization of counters 204, 206 and 208 and registers 234 and 242, processor 114 proceeds from the initialization subroutine of FIG. 10A to the core page processing subroutine of FIG. 10B, as indicated by an encircled letter B in those drawing figures. Processor 114 first determines at a decision junction 248 whether the numeral stored in encoded form in file page counter 206 is odd or even, indicating whether the current page in the print job is an odd page, to be reproduced by first printer 12 or 72, or an even page, to be reproduced by second printer 14 or 74. If the current page in the print job is odd, as determined by processor 114 at decision junction 248, processor 114 executes a step 250 in which it accesses active record page register 234 to identify the active record page and transfers that page from the active input queue 110 or 112 (FIG. 5) to a page build buffer 252 realized in internal processor memory. Processor 114 builds the page at 254 and then queries at 256 whether the contents of the record page counter are unity. If so, processor 114 performs a step 258 in which it accesses internal memory area 210 to obtain standard first page text and graphics and then merges the active record page data with the standard first page text and graphics in the build page buffer 252. Subsequently, processor 114 moves the contents of page build buffer 252 to LPT1 print buffer 120 (FIG. 5) in a step 260 and clear the page build buffer in a step 262. Processor 114 then checks at 264 whether the contents of file page counter 206 are greater than 8. If the file page counter contents are 8 or less, then the second printer has not yet started its printing operations on the current print job. Processor 114 then increments file page counter 206 in a step 266 and investigates at 268 whether the end of the current record has been reached. If not, the processor increments record page counter 208 in a step 270 and proceeds to initial print operations depicted in FIG. 10D, as indicated by an encircled letter D in FIGS. 10B and 10D.

If processor 114 determines at check 264 that the number encoded in file page counter 206 is greater than 8, the processor enters into the printing subroutine of FIG. 10E, as indicated by an encircled letter E in FIGS. 10B and 10E. If processor 114 determines at investigation 268 that the end of the current record has been reached, the processor executes the subroutine of FIG. 10C, as indicated by an encircled letter C in FIGS. 10B and 10C.

If the contents of file page counter 206 are even, as determined by processor 114 at decision junction 248, processor 114 executes a step 272 in which it accesses active record page register 234 to identify the active record page and transfers that page from the active input queue 110 or 112 (FIG. 5) to page build buffer 252. Processor 114 builds the page in a step 274 and then, in a step 276, checks the contents of internal memory register 242 and moves the contents of the active buffer A–D of LPT2 print buffer registers 122 (FIG. 5) to the fifth print buffer (E) of LPT2 print buffer registers 122. In subsequent steps 278 and 280, processor 114 moves the contents of the page build buffer 252 to the active buffer A–D of LPT2 print buffer registers 122 and clears page build buffer 252. Processor 114 then increments the contents of internal memory register 242 in a step 282. However, if the active LPT2 print buffer register of registers 122 is buffer D (#4), as determined by processor 114 at a decision junction 284, the processor first zeroes the contents of internal memory register 242 in a step 286. Processor 114 then checks at 288 whether the contents of file page counter 206 are greater than 8. If the file page counter contents are 8 or less, then the second printer has not yet started its printing operations on the current print job. Processor 114 then increments file page counter 206 in a step 290 and investigates at 292 whether the end of the current record has been reached. If not, the processor increments record page counter 208 in a step 294 and returns to decision junctions 248.

If processor 114 determines at check 288 that the number encoded in file page counter 206 is greater than 8, the processor enters into the printing subroutine of FIG. 10E, as indicated by an encircled letter E at an affirmative outcome of check 288. If processor 114 determines at investigation 292 that the end of the current record has been reached, the processor executes the subroutine of FIG. 10C, as indicated by an encircled letter C in FIGS. 10B and 10C.

At the beginning of the end-of-record processing subroutine of FIG. 10C, processor 114 decides at a junction 296 whether the current page of the print job, as indicated by the contents of file page counter 206, is an odd page or an even page. It is to be understood that current page is a blank page, the last data page of the current record having been processed already. If the contents of file page counter 206 indicate an even page number (a back side of a sheet), processor 114 moves text and graphics of a standard final page from internal memory area 212 to page build buffer 252 in a step 298, builds the page in a step 300 and then, in a step 302, accesses register 242 to determine which buffer A–D is active and moves the contents of that buffer to print buffer E (#5) of LPT2 print buffer registers 122 (FIG. 5). Subsequently, in a step 304, processor 114 moves the contents of page build buffer 252 to the active buffer of LPT2 print buffer registers 122 (FIG. 5) and, in a step 306, clears page build buffer 252. Processor 114 again accesses internal memory register 242 in an inquiry 308 to ascertain whether the active buffer A–D of LPT2 print buffer registers 12 is the last one (D). If not, the contents of register 242 are incremented in a step 310. If so, the contents of register 242 are first cleared in a step 312 prior to incrementation in step 310. Processor 114 then increments file page counter 206 in a step 314, increments record counter 204 in a step 316, clears record page counter 208 in a step 318, and increases the zeroed contents of record page counter 208 to unity in a step 320. Processor 114 then checks at 322 whether the contents of file page counter 206 are greater than 8. If the file page counter contents are 8 or less, then the second printer has not yet started its printing operations on the current print job. Processor 114 then proceeds to initial print operations depicted in FIG. 10D, as indicated by an encircled letter D in FIGS. 10C and 10D. If processor 114 determines at check 322 that the number encoded in file page counter 206 is greater than 8, the processor enters into the printing subroutine of FIG. 10E, as indicated by an encircled letter E in FIGS. 10C and 10E.

If processor 114 finds at decision junction 296 that the contents of file page counter 206 are an odd number (a front side of a sheet), the processor moves text and graphics of the standard final page from internal memory area 212 to page build buffer 252 in a step 324, builds the page in a step 326, moves the contents of the page build buffer to LPT1 print buffer 120 (FIG. 5) in a step 328, clears the page build buffer in a step 330, and increment file page counter 206 in a step 332. Processor 114 then accesses another internal memory area 334 and moves a blank page from that memory area to page build buffer 252 in a step 336 and builds the page in a step 338. At that juncture, processor 114 the end-of-record processing subroutine sequence starting with step 302.

In a first inquiry 340 in the printing subroutine of FIG. 10D, processor 114 checks whether the first printer 12 or 72 is ready and makes the printer ready in a step 344, if necessary. Processor 114 then monitors the position of the paper at a query 346 and positions the paper, if required, in a step 348. Subsequently, processor 114 transmits the contents of LPT1 print buffer 120 (FIG. 5) to the first printer 12 (FIG. 1) or 72 (FIG. 4) in a step 350 and transmits a print command to that printer in a step 352. After the transmission of a print command to the first printer 12 or 72 in step 352, processor 114 institutes a check 354 as to whether printing was successful. If so, LPT1 print buffer 120 is cleared in a step 356 and the processor returns to the core page processing subroutine of FIG. 10B. If not, the first printer 12 or 72 is idled in a step 358, while processor 114 searches for the fault in an investigation 360 and displays an error message regarding the fault in a step 362. After the operator rectifies the printing error, as confirmed by processor 114 in a step 364, the processor returns to the start of printing operations in FIG. 10A, as indicated by an encircled letter A in FIGS. 10D and 10A.

When utilizing both printers 12 (or 72) and 14 (or 74), processor 114 executes the subroutine of FIG. 10E. Processor 114 first confirms at 366 whether the first printer 12 or 72 is ready and rectifies the situation in a step 368, if necessary. Processor 114 then verifies the position of the first printer's paper at 370 and locates the paper, if required, in a step 372. In a step 374, processor 114 sends the contents of LPT1 print buffer 120 (FIG. 5) to the first printer 12 or 72. Processor 114 then detects at 376 whether the second printer 14 (FIG. 1) or 74 (FIG. 4) is ready and, in the event that the second printer is not ready, corrects the printer's readiness in a step 378. Once the printer is ready, processor 114 scans the positioning of the paper at a junction 380 and arranges the paper in a step 382, if called for. When the second printer 14 or 74 and its paper are prepared, processor 114 transfers the contents of fifth buffer E of LPT2 print buffers 122 to the second printer in a step 384. Processor 114 then transmits print commands to the two printers in respective steps 386 and 388 and retards the execution of that print command by an interval of a predetermined number of milliseconds (step 390).

In an inquiry 392, processor 114 determines whether printing has been successful. If there is a problem with the printing, the processor executes an error handling subroutine shown in FIG. 10F. If the printing proceeds as intended, processor 114 makes a check 394 as to whether the last record in the queue 110 or 112 has just been printed and that there are further records in the other print queue 112 or 110. If the check yields an affirmative determination, processor 114 proceeds to the last-record subroutine of FIG. 10G, to switch printing to the other queue. A negative determination at check 394 leads processor 114 to inquire at 396 as to whether the job has been finished, i.e., whether both queues 110 and 112 are empty. If so, processor 114 executes end-of-job processing (FIG. 10H). If not, processor clears LPT1 print buffer 120 in a step 398 and buffer E of LPT2 print buffers 122 in a step 400.

As illustrated in FIG. 10F, processor 114 first idles both printers in a step 402 when a printing error or malfunction has been detected. Processor 114 then determines the nature of the fault in a step 404, displays an error message in a step 406, and awaits operator intervention in a step 408. Upon rectification of the error by human intervention, processor 114 queries at 410 whether the printing is being done on continuous form sheets. If continuous sheets are being used, processor 114 first waits in a step 412 for the operator to form feed to the first printer 12 or 72 the equivalent of four blank print forms (where there is a four page delay between the first printer 12 or 72 and the second printer 14 or 74). A message may be displayed at this point to remind the operator of the procedure. If printing is being undertaken on separate sheets, processor 114 waits in a step 414 for the operator to form feed a single print form to the first printer 12 or 72. Again, a message may be displayed at this point to remind the operator of the proper procedure. In subsequent steps 416 and 418, the processor waits while the operator removes and disposes of pages representing records which will be reprocessed and clears and resets both printers. Again, prompts may be provided to the operator to ensure that proper rectification steps are performed.

At a decision junction 420, processor 114 investigates the contents of file page counter 206. If the file page counter contains an odd numeral, processor 114 decrements record counter 204 in a step 422. If the file page counter contains an even numeral, processor 114 first increments file page counter 206 in a step 424. Subsequently, processor 114 sets the contents of record page counter 208 at unity in steps 426 and 428, sets the contents of active record page register 234 at unity in steps 430 and 432, and sets the contents of register 242 at unity in steps 434 and 436. Processor 114 then clears LPT1 print buffer 120 and buffers A–E of LPT2 print buffers 12 in steps 438 and 440 and returns to decision junction 248 at the beginning of the core page processing subroutine in FIG. 10B.

FIG. 10G depicts a subroutine for switching from one input queue 110 or 112 to the other during the processing of a single print job. Thus, the last-record subroutine of FIG. 10G serves to begin a portion of a print job stored in the other input queue 112 or 110 and for loading further print data from a mainframe, etc., 38 into the queue 110 or 112 holding the job portion which has just been printed. Processor 114 makes a check 442 into the state of a memory or software switch 444 to determine whether the second input queue 112 is active, i.e., has been accessed by the processor during a printing operation. If so, processor 114 switches to the first input queue 110 in a step 446, rebuilds or reloads the second input queue 112 in a step 448 and sets a memory or software switch 444 for the second queue 112 to an inactive state in a step 450. If the second input queue 112 is not active, as established at check 442, processor 114 switches to that second queue in a step 452, rebuilds the first input queue 110 in a step 454, and sets memory or software switch 444 to an active state in a step 456.

As illustrated in FIG. 10H, a subroutine executed at the end of a print job begins with processor 114 accesses record page counter 208 to determine in an inquiry 458 whether the file page number is greater than 8. If so, processor 114 terminates processing operations in a step 460 and displays a message in a step 462 indicating that the job has been finished. If the page number in file page counter 208 is eight or less, processor 114 moves a blank page from internal memory area 334 to page build buffer 252 in a step 464, builds a page at 466, moves the contents of the page build buffer to LPT1 print buffer 120 (FIG. 5) in a step 468, and clears page build buffer 252 in a step 470. Processor 114 then moves the contents of the active print buffer B, C, or D of LPT2 print buffers 122 to buffer E of print buffers 122 in a step 472 and subsequently accesses internal memory register 242 in an investigation 474 to determine whether the active LPT2 print buffer is the fourth buffer D. If so, processor 114 zeroes the active LPT2 print buffer register 242 in a step 476. Processor 114 then increments register 242 in a step 478, and increments record page counter 208 in a step 480. After incrementing the record page counter, processor 114 executes the printing routine of FIG. 10E.

It is recommended that woven or smooth paper be used, rather than "laid" or textured paper. Paper weight should be at least 20 lb. and the printers will accept 24 to 28 lb. Good results have been obtained with Hammeril Laser 24 lb. bond single sheets and Hewlett-Packard "Z-fold" continuous form stripped of perforated side strips.

Cost savings can be realized by eliminating the letter paper tray, rollers for raising paper from the paper tray, and rollers used to push printed documents out the tops of the printers. Antistatic material, laminates or coatings effective at different humidities can be provided for the various guide surfaces. Japanese patent document No. 116807 discloses such materials with respect to lids and bags.

In the embodiment of FIG. 1 (continuous form sheet feed), one or more photoelectric sensors (not shown) may be provided for monitoring the paper path. Upon a detecting of light, indicating that the paper form has been interrupted, a signal from the photosensor(s) triggers an error condition.

Figure 11:
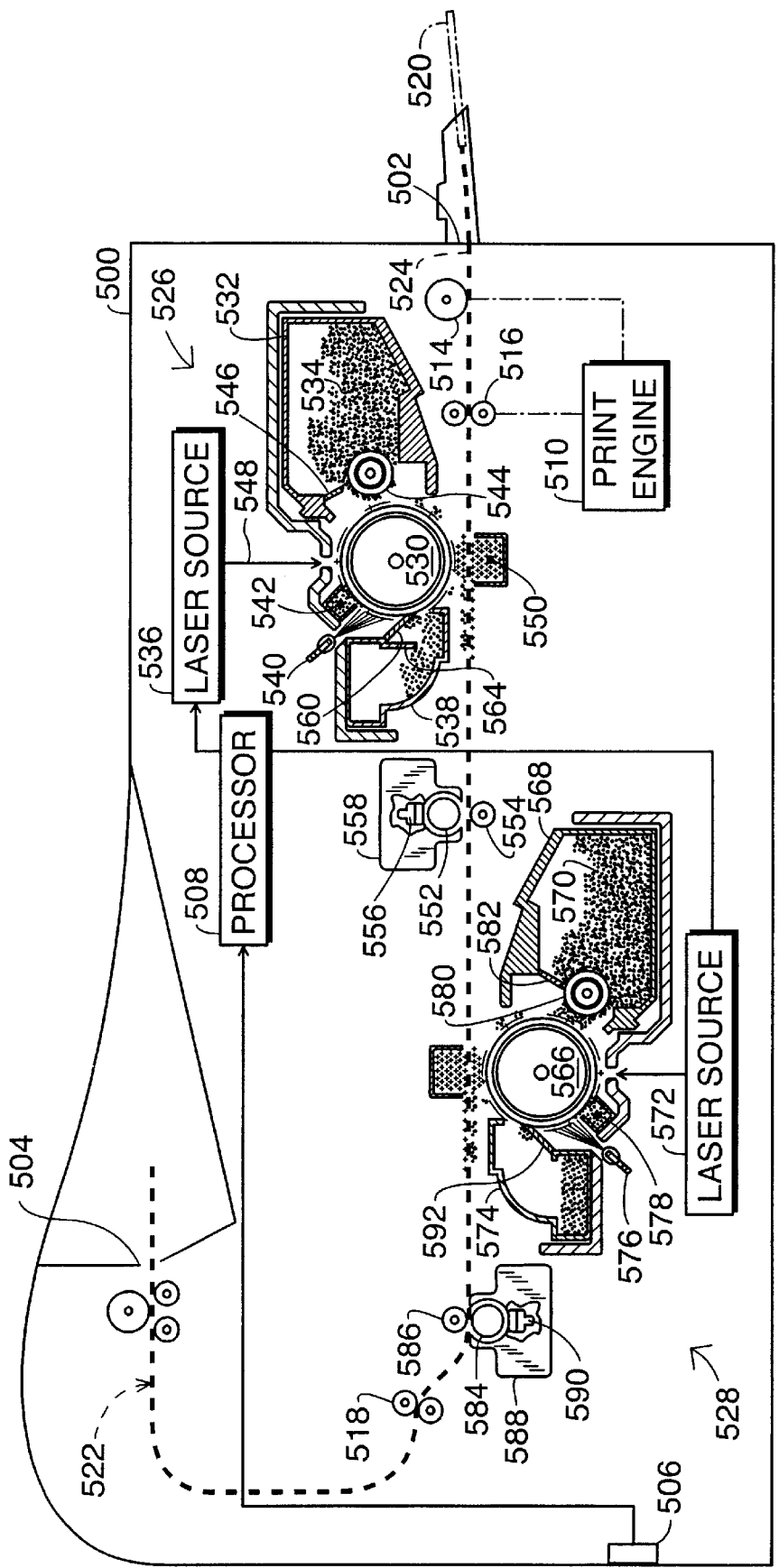
FIG. 11 is a schematic cross-sectional view of a laser printer for two-sided printing in accordance with the present invention.
Figure 12:
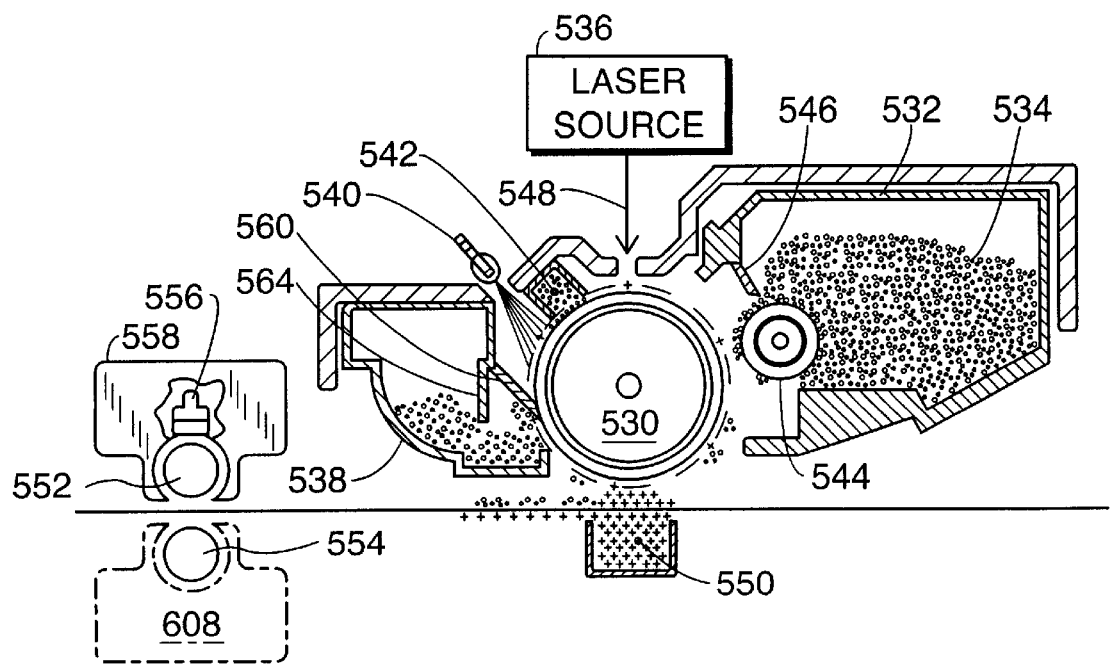
FIG. 12 is a schematic cross-sectional view of an upper laser printing assembly in the laser printer of FIG. 11.
Figure 13:
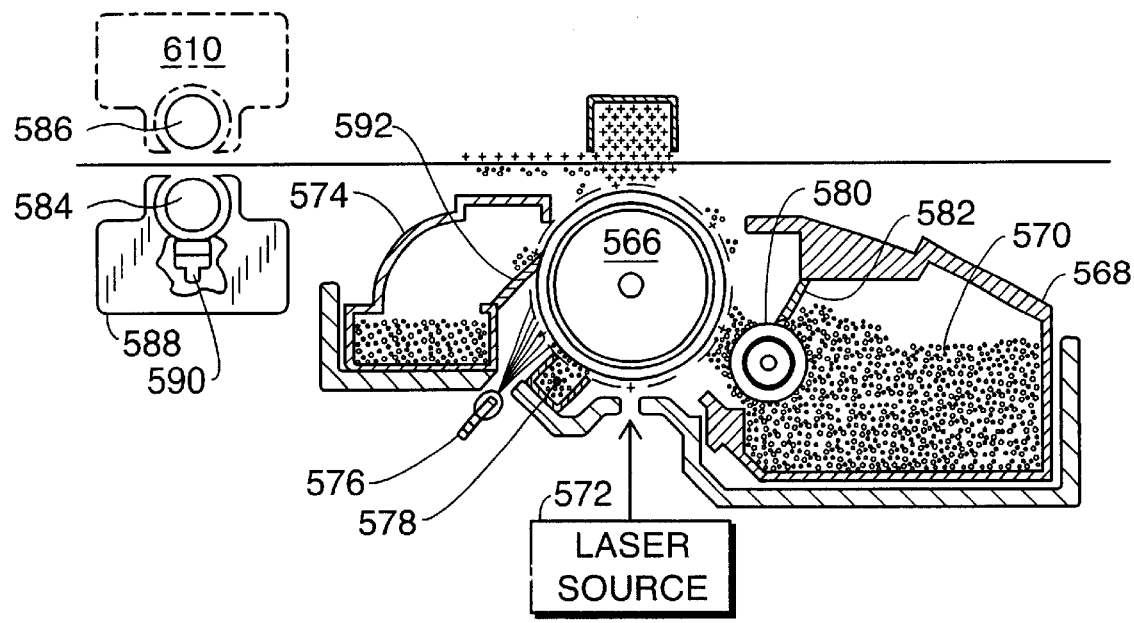
FIG. 13 is a schematic cross-sectional view of a lower laser printing assembly in the laser printer of FIG. 11.

As illustrated in FIGS. 11–13, a desk-top laser printer has a housing 500 provided with a paper input port 502, a paper output port 504 and a data input port 506. Data input port 506 is connected to a digital processor 508 which is disposed in housing 500 and which is programmed to detect odd pages and even pages in an electronically encoded document arriving via data input port 506 and to separate odd pages of the document from even pages thereof. A single print engine assembly 510 is provided in housing 500 and includes a motor or drive (not separately illustrated) operatively coupled to a plurality of rollers 514, 516, and 518 for moving a paper sheet 520 through printer housing 500 from paper input port 502 to paper output port 504 along a predetermined path 522.

Path 522 includes a linear segment 524 along which two laser printing assemblies 526 and 528 are disposed at respective print stations. The first laser printing assembly 526 is disposed in housing 500 along an upper side of path segment 524 for printing an odd-numbered page of the document on a first side of paper sheet 520. The second laser printing assembly 528 is disposed in housing 500 along a lower side of path segment 524 for printing an even-numbered page of the document along an opposite side of paper sheet 520. Processor 508 is operatively connected to the laser printing assemblies 526 and 528 for controlling the printing assemblies to print consecutive odd and even pages of the document on opposite sides of a train of paper sheets. The paper sheets may be separate single sheets or sheets connected to one another in a Z-fold, as described above.

Because paper sheet 520 travels along a linear or straight path segment 524 from one laser printing assembly 526 to the other 528, the paper is easily aligned. There is less paper jamming and less paper warping than there would be in a printer with a curved paper path between the two laser print stations.

As illustrated in FIGS. 11 and 12, laser printing assembly 526 includes a drum 530 having a surface made of an organic photoconductive material, a toner reservoir 532 containing a toner powder 534, a laser source 536 including directional optics (not separately illustrated), a toner waste reservoir 538, an erase lamp 540, and a corona wire 542. A magnetic developer roller 544 is provided at an outlet of the toner reservoir 532 for drawing toner from the reservoir through a gap defined by a so-called doctor blade 546 and for enhancing the magnetic properties of the toner.

The toner which is delivered to photoconductive drum 530 by developer roller 544 is magnetically attached to the drum at points which were exposed to radiation 548 from source 536. The toner particles on drum 530 are transferred to an upper surface of paper sheet 520 from the drum, while maintaining the relative distribution pattern of the toner. This transfer is also effectuated via magnetic attraction between the toner particles and the paper which is magnetized by a corona wire 550. Subsequently, the toner is melted and fused to the paper by heat and pressure applied via a fuser roller 552 and a pressure roller 554. The surface temperature of the fuser roller 550 is raised by a heater lamp 556 provided in a fuser casing 558.

Toner particles remaining on drum 530 after toner transfer to paper 520 are removed from drum 530 by a wiper blade 560 and fall into waste reservoir 538 having a separator baffle 564. Erase lamp 540 irradiates drum 530 for purposes of clearing residual charge on the drum. Corona wire 542 then deposits a uniform charge distribution on drum 530 prior to irradiation of drum with laser energy from source 536 in a pattern determined by the content of a document encoded in a signal transmitted from a mainframe or other computer over data input port 506 to processor 508.

Laser printing assembly 528 is substantially similar to laser printing assembly 526. As depicted in FIGS. 11 and 13, laser printing assembly 528 includes a photoconductive drum 566, a toner reservoir 568 holding a toner powder 570, a scanning laser source 572, a toner waste reservoir 574, an erase lamp 576, and a corona wire 578. A magnetic developer roller 580 disposed at an outlet of toner reservoir 568 extracts toner from the reservoir through a gap between the developer roller and a doctor blade 582 and for enhancing magnetic fields of the toner particles.

The toner particles deposited on drum 566 in a predetermined pattern are transferred via magnetic attraction to a lower surface of paper sheet 520, while maintaining the same pattern. The transferred toner is melted and fused to paper sheet 520 by heat and pressure applied via a fuser roller 584 and a pressure roller 586. Fuser roller 584 is mounted to a fuser casing 588 and is heated by a lamp 590 provided in casing 588.

Toner particles remaining on drum 566 after toner transfer to the lower surface of paper sheet 520 are removed from drum 566 by a wiper blade 592 and fall into waste reservoir 74. Waste reservoir 574 does not have a baffle (see baffle 564 of laser printing assembly 26). Erase lamp 576 clears residual charge from drum 566, while corona wire 578 deposits a uniform charge distribution on drum 566 prior to irradiation of the drum with laser energy from source 572.

Figure 14:
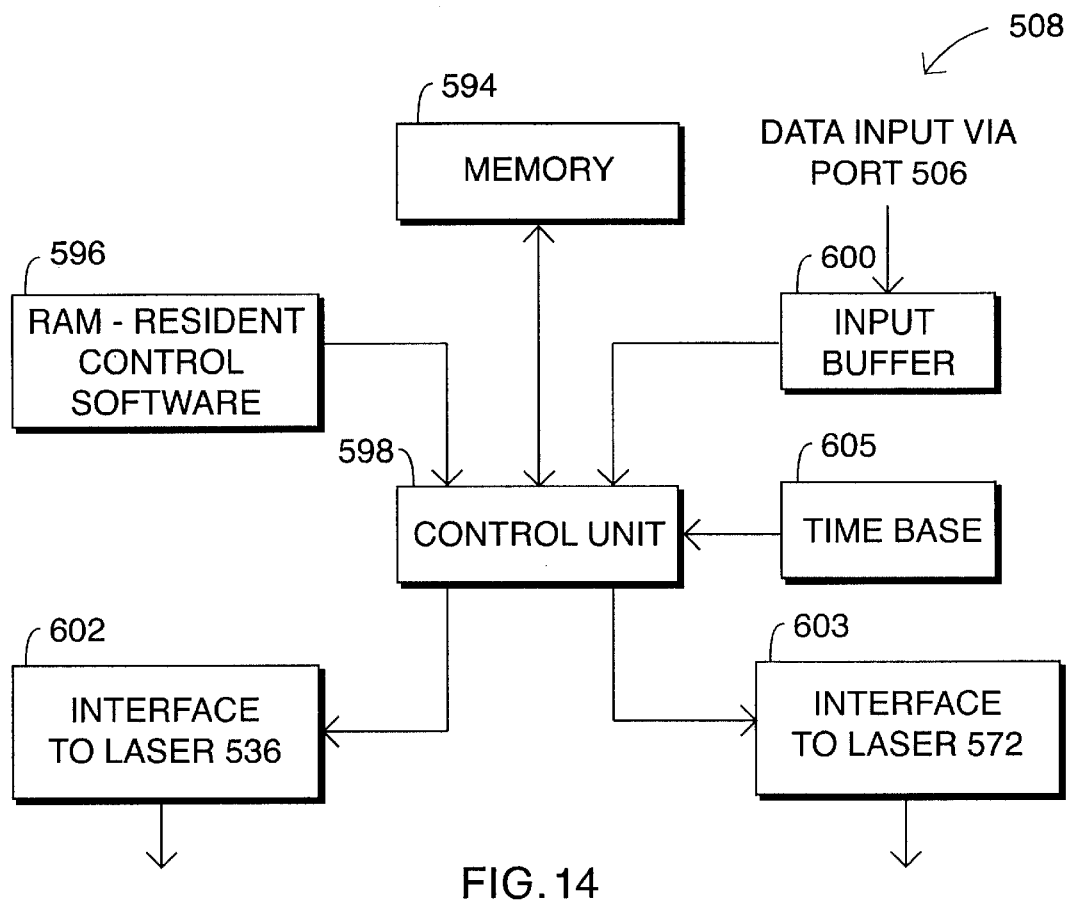
FIG. 14 is a block diagram of a programmable processor in the laser printer of FIG. 11.

As shown in FIG. 14, processor 508 includes a memory 594 which stores decoding instructions for different types of computers and different database programs. In response to instructions from RAM resident control software 596, a control unit 598 accesses memory 594 to enable the control unit to detect different pages of the multiple page document received by a buffer/interface 600 from a mainframe or other document-generating computer via data input port 506. The incoming multiple page document is temporarily stored in buffer 600.

Control unit 598 has an internal structure and operation similar to that described hereinabove with reference to control unit 56 and FIG. 3. Thus, control unit 598 also includes page splitter module 60 (FIG. 3) for detecting and splitting the odd pages from the even pages in a multiple page document arriving via data input port 506. Page splitter module 60 (FIG. 3) feeds the odd pages in sequence to laser source 536 (FIGS. 11 and 12) via an interface module 602 and feeds the even pages in sequence to laser source 572 (FIGS. 11 and 13) via delay or buffer 64 (FIG. 3) and an interface module 603 (FIG. 14). In the printer of FIGS. 11–14, a timing signal from a time base 605 in processor 508 controls delay 64 to postpone the transmission of the even page sequence to laser printing assembly 528 by an interval substantially equal to the transit time of paper sheet 520 from one laser printing assembly 526 to the next 528, thereby synchronizing the operation of the two laser printing assemblies so that opposite sides of essentially every sheet of sheet 520 bear consecutive pages. The operation of programming selector 70 is as discussed above.

Figure 15:
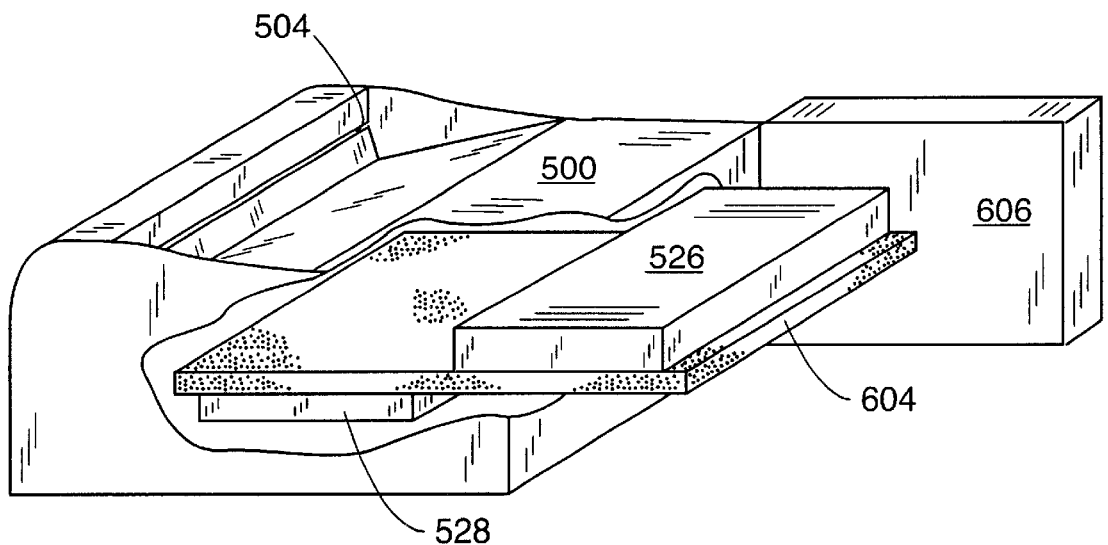
FIG. 15 is a schematic isometric view of the laser printer of FIG. 11, showing a carriage to which the laser printing assemblies of FIGS. 12 and 13 are attached.

As illustrated in FIG. 15, laser printing assemblies 526 and 528 are mounted to a carriage 604 in housing 500. Housing 500 is provided with a front panel 606 hinged for swinging sideways, as shown, to enable a moving of carriage 604 at least partially out of the housing. To that end, carriage 604 is translatably mounted to housing 500, e.g., via roller bearings, (not shown). Accordingly, laser printing assemblies 526 and 528 may be easily removed from housing 500 for servicing. Laser printing assembly 526 is mounted to an upper side of carriage 604, while laser printing assembly 528 is mounted to an underside of carriage 604. Toner cartridge or reservoir 532 of laser printing assembly 526 is replaced from above carriage 604 whereas toner cartridge or reservoir 568 of laser printing assembly 528 is removed from below the carriage.

Processor 508 is programmed, as described above, to generate a printed document from (1) encoded information peculiar to the document and (2) standard textual and graphic information incorporated into a plurality of documents.

As illustrated in FIGS. 12 and 13 pressure rollers 554 and 586 may be implemented as fuser rollers which are disposed in respective fuser casings 608 and 610. The provision of fuser rollers on opposite sides of paper sheet 520 at toner fusing stations serves to eliminate paper warping which occurs when one side of a paper sheet is heated. The elimination of heat-induced paper warping reduces incidents of paper misalignment and jamming.

Although the invention has been described in terms of particular embodiments and applications, one of ordinary skill in the art, in light of this teaching, can generate additional embodiments and modifications without departing from the spirit of or exceeding the scope of the claimed invention. For example, it may be possible to print even pages of a document with the first printer 12 or 72 and odd pages with the second printer 14 or 74. Accordingly, it is to be understood that the drawings and descriptions herein are proffered by way of example to facilitate comprehension of the invention and should not be construed to limit the scope thereof.

What is claimed is:

1. A printing apparatus comprising:

a desk-top printer housing having a paper input port, a paper output port and a data input port;

a digital processor disposed in said housing and operatively connected to said data input port, said processor being programmed to detect odd pages and even pages in an electronically encoded document arriving via said data input port and to separate odd pages of said document from even pages thereof;

paper moving means disposed in said housing for moving a single or individual paper sheet through said printer housing from said paper input port to said paper output port along a predetermined path;

a first laser printing assembly disposed in said housing along one side of said path for printing an odd-numbered page of said document along one side of said paper sheet;

a second laser printing assembly disposed in said housing along an opposite side of said path for printing an even-numbered page of said document along an opposite side of said paper sheet; and a carriage movably mounted to said housing, the laser printing assemblies being mounted to said carriage for enabling an extraction of said laser printing assemblies from said housing for servicing, said processor being operatively connected to said first laser printing assembly and said second laser printing assembly for controlling said first laser printing assembly to print said odd-numbered page of said document along said one side of said paper sheet and for controlling said second laser printing assembly to print said even-numbered page of said document along said opposite side of said paper sheet.

2. The printing apparatus defined in claim 1 wherein said path is essentially linear, one of the laser printing assemblies being located above said path and the other of said laser printing assemblies being located below said path.

3. The printing apparatus defined in claim 1 wherein one of said laser printing assemblies is mounted to an upper side of said carriage, the other of said laser printing assemblies being mounted to an underside of said carriage, whereby a toner cartridge of said one of said laser printing assemblies is removed from above said carriage whereas a toner cartridge of said other of said laser printing assemblies is removed from below said carriage.

4. The printing apparatus defined in claim 3 wherein said paper moving means includes only one print engine.

5. The printing apparatus defined in claim 1 wherein said first laser printing assembly and said second laser printing assembly each include a drum having a photosensitive surface, a toner reservoir, a laser, a toner waste reservoir, an erase lamp, and a corona wire.

6. The printing apparatus defined in claim 1 wherein said paper moving means includes only one print engine.

7. The printing apparatus defined in claim 1 wherein said processor is further programmed to synchronize operation of said first laser printing assembly and said second laser printing assembly so that opposite sides of essentially every sheet bear consecutive pages.

8. The printing apparatus set forth in claim 1 wherein said first laser printing assembly and said second laser printing assembly are modified conventional laser printer components.

9. The printing apparatus set forth in claim 1 wherein said processor is programmed to generate said document from (1) encoded information peculiar to said document and (2) standard textual and graphic information incorporated into a plurality of documents.

10. A printing method comprising:

providing a desk-top laser printer for printing documents encoded in computer generated digital signals, said laser printer having two laser printing assemblies disposed in a single desk-top housing, said laser printer including a digital processor disposed in said housing, said digital processor being operatively coupled to said laser printing assemblies, each of said laser printing assemblies having a respective removable toner cartridge;

transmitting a multiple page document in digitally encoded form to said processor via a data input of said laser printer, operating said processor to detect odd pages and even pages in said document and to separate odd pages of said document from even pages thereof;

moving a single or individual paper sheet through said housing from a paper input port to a paper output port along a predetermined path, said laser printing assemblies being disposed along opposite sides of said path;

energizing one of said laser printing assemblies, in response to a signal from said processor, to print an odd-numbered page of said document along one side of said paper sheet;

energizing the other of said laser printing assemblies, in response to another signal from said processor, to print an even-numbered page of said document along an opposite side of said paper sheet; and removing the toner cartridges of said laser printing assemblies from said laser printer and inserting replacement toner cartridges into said laser printer in place of the removed toner cartridges, said laser printer including a carriage movably mounted to said housing, said laser printing assemblies being mounted to said carriage, further comprising moving said carriage and said laser printing assemblies at least partially out of said housing for equipment servicing purposes.

11. The printing method defined in claim 10 wherein one of said laser printing assemblies is mounted to an upper side of said carriage, the other of said laser printing assemblies being mounted to an underside of said carriage, the removing of said toner cartridges including removing the toner cartridge of said one of said laser printing assemblies from above said carriage and the toner cartridge of said other of said laser printing assemblies from below said carriage.

12. The printing method set forth in claim 10 wherein said processor is operated to control energization of said laser printing assemblies so that opposite sides of essentially every sheet sent through said laser printer portion bear consecutive pages.

13. The printing method defined in claim 10, further comprising operating said processor to synchronize operation of said laser printing assemblies so that opposite sides of essentially every sheet sent through said laser printer bear consecutive pages.

14. The printing method set forth in claim 10 further comprising operating said processor to generate said document from (1) encoded information peculiar to said document and (2) standard textual and graphic information incorporated into a plurality of documents.

15. A printing apparatus comprising:

a desk-top printer housing having a paper input port, a paper output port and a data input port;

a digital processor disposed in said housing and operatively connected to said data input port, said processor being programmed to detect odd pages and even pages in an electronically encoded document arriving via said data input port and to separate odd pages of said document from even pages thereof;

paper moving means disposed in said housing for moving a paper sheet through said printer housing from said paper input port to said paper output port along a predetermined path, said paper moving means including only one print engine;

a first laser printing assembly disposed in said housing along one side of said path for printing an odd-numbered page of said document along one side of said paper sheet; and a second laser printing assembly disposed in said housing along an opposite side of said path for printing an even-numbered page of said document along an opposite side of said paper sheet, said processor being operatively connected to said first laser printing assembly and said second laser printing assembly for controlling said first laser printing assembly to print said odd-numbered page of said document along said one side of said paper sheet and for controlling said second laser printing assembly to print said even-numbered page of said document along said opposite side of said paper sheet.

* * * * *